US012639842B2

(12) United States Patent
Gong et al.

(10) Patent No.: US 12,639,842 B2
(45) Date of Patent: May 26, 2026

(54) IMAGE DEPTH PREDICTION METHOD AND ELECTRONIC DEVICE

(71) Applicant: HUAWEI TECHNOLOGIES CO., LTD., Shenzhen (CN)

(72) Inventors: Yue Gong, Hangzhou (CN); Xinjun Ma, Shenzhen (CN); Jianan He, Wuhan (CN); Lei Chen, Shenzhen (CN); Fan Yu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 444 days.

(21) Appl. No.: 18/468,293

(22) Filed: Sep. 15, 2023

(65) Prior Publication Data

US 2024/0005541 A1 Jan. 4, 2024

Related U.S. Application Data

(63) Continuation of application No. PCT/CN2022/079543, filed on Mar. 7, 2022.

(30) Foreign Application Priority Data

Mar. 16, 2021 (CN) .......................... 202110289766.6

(51) Int. Cl.
*G06K 9/00* (2022.01)
*G06T 3/40* (2006.01)
(Continued)

(52) U.S. Cl.
CPC ................ *G06T 7/593* (2017.01); *G06T 3/40* (2013.01); *G06T 7/62* (2017.01); *G06V 10/44* (2022.01)

(58) Field of Classification Search
CPC ........... G06T 7/593; G06T 2207/10012; G06T 2207/20084; G06T 7/60; G06T 7/62;
(Continued)

(56) References Cited

U.S. PATENT DOCUMENTS

2019/0197713 A1* 6/2019 Babon ..................... G06T 7/593

FOREIGN PATENT DOCUMENTS

CN 110176060 A 8/2019

OTHER PUBLICATIONS

Cheng, S., Xu, Z., Zhu, S., Li, Z., Li, L. E., Ramamoorthi, R., & Su, H. (2020). Deep stereo using adaptive thin volume representation with uncertainty awareness. In Proceedings of the IEEE/CVF conference on computer vision and pattern recognition (pp. 2524-2534). (Year: 2020).*

(Continued)

*Primary Examiner* — Gregory A Morse
*Assistant Examiner* — Kevin M Coomber
(74) *Attorney, Agent, or Firm* — WOMBLE BOND DICKINSON (US) LLP

(57) ABSTRACT

This application relates to the field of image processing technologies, and in some embodiments, to an image depth prediction method and an electronic device. The method includes: obtaining a primary view and a first secondary view, where the primary view includes a first pixel, the first pixel corresponds to a second pixel at a first assumed depth, and the second pixel is located on the first secondary view; updating feature information of the second pixel based on the feature information of the second pixel and feature information of at least one third pixel, the fourth pixel is a pixel that corresponds to the first pixel at a second assumed depth and that is on the first secondary view; and obtaining a probability of the first assumed depth based on the feature information of the first pixel and the updated feature information of the second pixel.

20 Claims, 11 Drawing Sheets

(51) Int. Cl.
  *G06T 7/593*  (2017.01)
  *G06T 7/62*  (2017.01)
  *G06V 10/44*  (2022.01)
(58) Field of Classification Search
  CPC .. G06T 7/50; G06T 3/40; G06V 10/44; G06V
       2201/12; G06N 3/0464; H04N 13/128;
                 H04N 13/122
  See application file for complete search history.

(56) References Cited

OTHER PUBLICATIONS

Yang, J., Mao, W., Alvarez, J. M., & Liu, M. (2020). Cost volume pyramid based depth inference for multi-view stereo. In Proceedings of the IEEE/CVF conference on computer vision and pattern recognition (pp. 4877-4886). (Year: 2020).*
Yao Yao et al:"Recurrent MVSNet for High-resolution Multi-view Stereo Depth Inference",2019, total 10 pages.
Jiayu Yang et al:"Cost Volume Pyramid Based Depth Inference for Multi-View Stereo",2020, total 10 pages.
Shuo Cheng et al:"Deep Stereo using Adaptive Thin Volume Representation with Uncertainty Awareness",2020, total 11 pages.
Xinjun Ma et al:"EPP-MVSNet: Epipolar-assembling based Depth Prediction for Multi-view Stereo." DOI: 10.1109/ICCV48922.2021.00568. Oct. 10, 2021. total 9 pages.

* cited by examiner

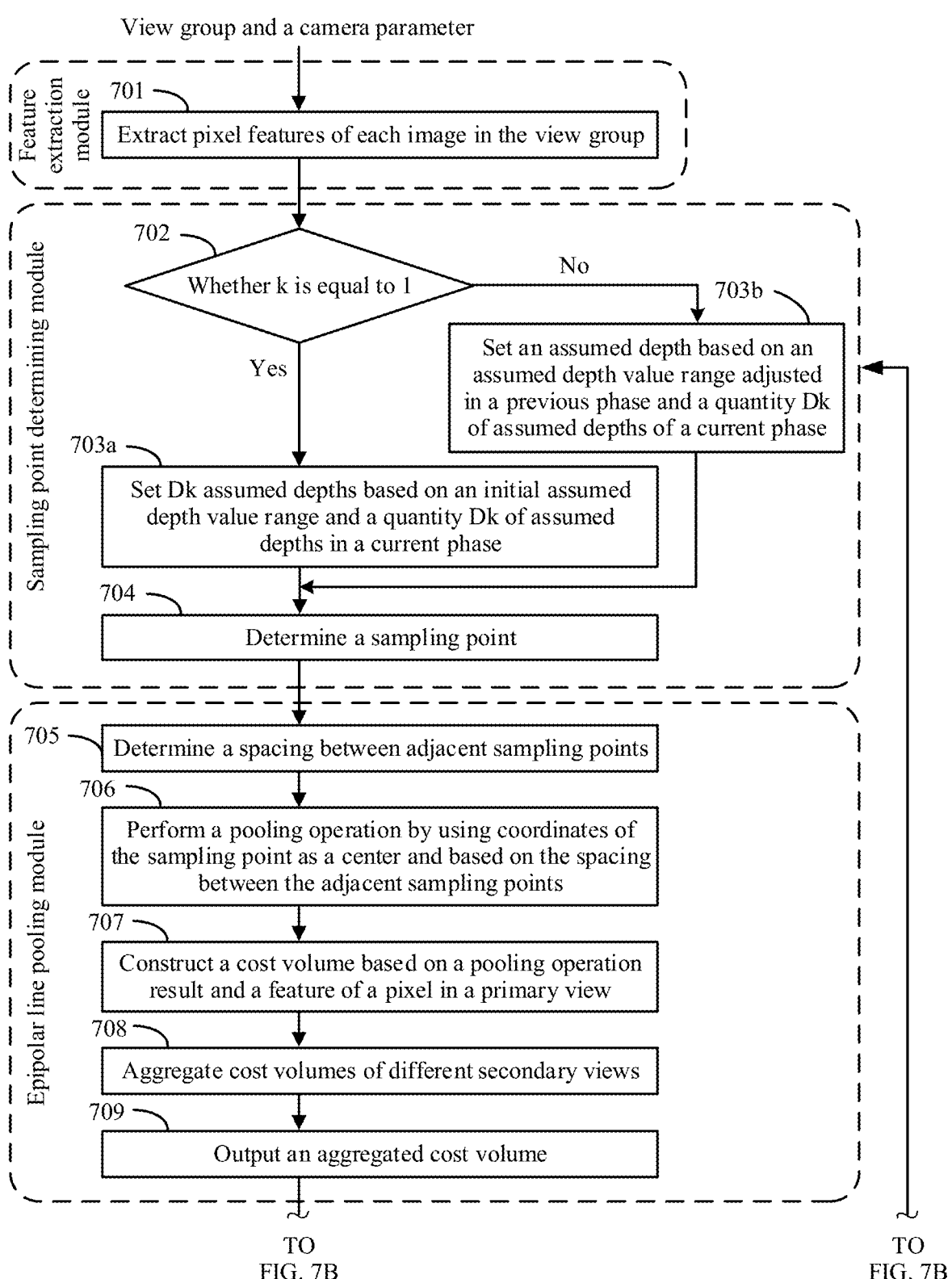

View group and a camera parameter

Feature extraction module

701

Extract pixel features of each image in the view group

Sampling point determining module

702

Whether k is equal to 1

No

703b

Set an assumed depth based on an assumed depth value range adjusted in a previous phase and a quantity Dk of assumed depths of a current phase Yes 703a Set Dk assumed depths based on an initial assumed depth value range and a quantity Dk of assumed depths in a current phase

704

Determine a sampling point

Epipolar line pooling module

705

Determine a spacing between adjacent sampling points

706

Perform a pooling operation by using coordinates of the sampling point as a center and based on the spacing between the adjacent sampling points

707

Construct a cost volume based on a pooling operation result and a feature of a pixel in a primary view

708

Aggregate cost volumes of different secondary views

709

Output an aggregated cost volume

Obtain a primary view and a first secondary view, where the primary view and the first secondary view are images photographed by a camera facing a first object at different angles, the primary view includes a first pixel, the first pixel corresponds to a second pixel at a first assumed depth, and the second pixel is located on the first secondary view

902

Update feature information of the second pixel based on the feature information of the second pixel and feature information of at least one third pixel, where the at least one third pixel is located on a connection line between the second pixel and a fourth pixel, the fourth pixel is a pixel that corresponds to the first pixel at a second assumed depth and that is on the first secondary view, the second assumed depth and the first assumed depth are adjacent in preset D assumed depths, and D is a positive integer greater than 1

903

Obtain a probability of the first assumed depth based on feature information of the first pixel and the updated feature information of the second pixel, where the probability of the first assumed depth indicates a possibility that the first assumed depth is a real depth of the first pixel

FIG. 9

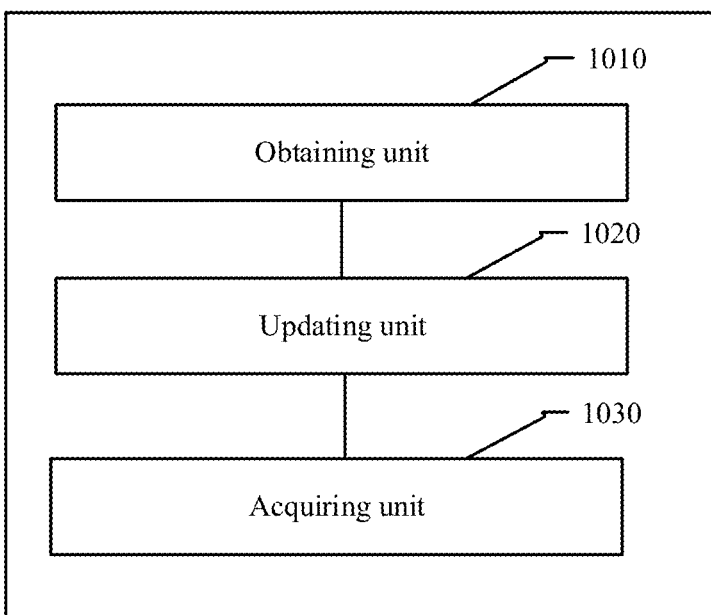

FIG. 10

IMAGE DEPTH PREDICTION METHOD AND ELECTRONIC DEVICE

CROSS-REFERENCE TO RELATED APPLICATIONS

This application is a continuation of International Application No. PCT/CN2022/079543, filed on Mar. 7, 2022, which claims priority to Chinese Patent Application No. 202110289766.6, filed on Mar. 16, 2021. The disclosures of the aforementioned applications are hereby incorporated by reference in their entireties.

TECHNICAL FIELD

This application relates to the field of image processing technologies, and in particular, to an image depth prediction method and an electronic device.

BACKGROUND

A three-dimensional (3D) reconstruction technology of an image is widely applied, for example, applied in geological surveying, map surveying and mapping, augmented reality (AR), and virtual reality (VR). Especially with the development of an AR technology, a mobile terminal such as a mobile phone also has an AR function. Therefore, applications (APP) such as environment interaction, information push, and virtual entertainment based on the AR technology emerge. There is also more demand for the three-dimensional reconstruction technology.

At present, the three-dimensional reconstruction technology is mainly classified into the following three types:

a: Laser collection has best reconstruction effect and can directly output a point cloud result. However, a collection device is expensive and a collection process is difficult. Therefore, laser collection is not suitable for common consumers.

b: Depth camera collection may directly obtain depth information of a photographed scene, and costs are relatively low compared with laser collection. However, effect of three-dimensional reconstruction is average.

c: An RGB image combined with multi-view stereo (MVS) algorithm has low costs, and reconstruction effect is second only to the laser collection. Therefore, this has comprehensive advantages over the laser collection technology and the depth camera collection. Especially, a multi-view stereo algorithm based on deep learning has high precision and a calculation speed, and has been widely used.

The multi-view stereo algorithm includes two parts: depth prediction and point cloud fusion. An image depth predicted through depth prediction directly determines precision of a point cloud. A principle of depth prediction is to set a plurality of assumed depths, find sampling points of a primary view pixel on a secondary view at each assumed depth through a single-factor change, calculate a similarity between the primary view pixel and the sampling points at each assumed depth, determine a probability that each assumed depth is a real depth of the primary view pixel, and use an assumed depth with a maximum probability as a prediction result. Therefore, how to enable a pixel that corresponds to a pixel of the primary view at the real depth and that is on the secondary view to participate in depth prediction is of great significance to improve effect of depth prediction.

SUMMARY

Embodiments of this application provide an image depth prediction method and an electronic device, to improve depth prediction effect.

According to a first embodiment, an embodiment of this application provides an image depth prediction method, including: obtaining a primary view and a first secondary view, where the primary view and the first secondary view are images photographed by a camera facing a first object at different angles, the primary view includes a first pixel, the first pixel corresponds to a second pixel at a first assumed depth, and the second pixel is located on the first secondary view; updating feature information of the second pixel based on the feature information of the second pixel and feature information of at least one third pixel, where the at least one third pixel is located on a connection line between the second pixel and a fourth pixel, the fourth pixel is a pixel that corresponds to the first pixel in the first secondary view at a second assumed depth, the second assumed depth and the first assumed depth are adjacent in preset D assumed depths, and D is a positive integer greater than 1; and obtaining a probability of the first assumed depth based on feature information of the first pixel and the updated feature information of the second pixel, where the probability of the first assumed depth indicates a possibility that the first assumed depth is a real depth of the first pixel.

In the method, features of pixels between adjacent sampling points may be aggregated to features of nearby sampling points, and a possibility that a corresponding assumed depth is a real depth of a pixel in a primary view is determined accordingly, so that a pixel feature corresponding to the real depth can participate in depth prediction with a higher probability, so that accuracy of depth prediction is improved.

It may be determined, by using homography transformation, that the first pixel corresponds to the second pixel at the first assumed depth. In homography transformation, coordinates of the first pixel in the primary view may be converted into coordinates of an object point in a camera coordinate system at the assumed depth, and then the coordinates of the object point in the camera coordinate system are converted into pixel coordinates in a secondary view, where the pixel coordinates correspond to the second pixel. For an implementation process of the homography transformation, refer to descriptions in the conventional technology. Details are not described herein again.

The assumed depth refers to a depth assumed for a pixel in a depth prediction process, and may be a depth manually set based on a camera parameter of the primary view and the secondary view.

The real depth refers to an actual depth of a pixel, and is a distance between an object point corresponding to the pixel and a plane on which an image is recorded.

The connection line between the second pixel and the fourth pixel refers to a line segment in which the second pixel is used as an endpoint on one side and the fourth pixel is used as an endpoint on the other side. That is, the connection line is a line segment in which the second pixel and the fourth pixel are endpoints.

In some embodiments, the method further includes: updating feature information of the fourth pixel based on the feature information of the fourth pixel and feature information of at least one fifth pixel, where the at least one fifth pixel is located on a connection line between the second pixel and the fourth pixel; and obtaining a probability of the second assumed depth based on the feature information of the first pixel and the updated feature information of the fourth pixel, where the probability of the second assumed depth indicates a possibility that the second assumed depth is the real depth of the first pixel.

In some embodiments, the at least one fifth pixel and the at least one third pixel are different from each other, and the at least one fifth pixel is closer to the fourth pixel than the at least one third pixel; or a pixel included in the at least one fifth pixel but not included in the at least one third pixel is closer to the fourth pixel than a pixel included in the at least one third pixel but not included in the at least one fifth pixel.

In other words, in this implementation, features of pixels other than sampling points on an epipolar line may be aggregated to features of nearest sampling points, to participate in depth prediction. Therefore, misjudgment in image depth prediction can be avoided or reduced.

In some embodiments, a union set of the at least one fifth pixel and the at least one third pixel includes all pixels between the second pixel and the third pixel.

In other words, all pixels between adjacent sampling points may participate in depth prediction, so that it can be ensured that a pixel feature corresponding to a real depth can participate in depth prediction, thereby improving accuracy of depth prediction.

In some embodiments, the method further includes: scaling down a size of a value range corresponding to the D assumed depths to obtain a size of a first range, where the first range is used as a value range of an assumed depth during depth re-prediction of the first pixel. The value range corresponding to the D assumed depths refers to a depth value range including the D assumed depths, and the D assumed depths are obtained by taking D depth values in the value range.

A predicted depth determined by probabilities of the D assumed depths may be used as a median value of the first range. Therefore, a range with an upper and lower limits may be determined, to re-predict the depth of the first pixel. In an example, an assumed depth with a maximum probability in the D assumed depths may be used as the predicted depth. In another example, each of the D assumed depths may be multiplied by its probability to obtain a depth value. D depth values may be obtained for the D assumed depths, and the D depth values are summed up to obtain the predicted depth.

In other words, in this embodiment, a value range in which the assumed depth is located may be scaled down, and a predicted depth is used as a median value of a value range that is scaled down. Therefore, accuracy of depth prediction can be improved while calculation complexity is reduced.

In some embodiments, a scale-down amplitude of the value range corresponding to the D assumed depths is negatively correlated to a dispersion degree between the probabilities of the D assumed depths.

It may be understood that a higher dispersion degree of a plurality of probabilities indicates a higher uncertainty that the assumed depth is or is not the real depth of the pixel. In this case, a value range in which the assumed depth is located is slightly scaled down, so that the value range that is scaled down may include the real depth with a high probability.

In some embodiments, a scale-down amplitude of the value range corresponding to the D assumed depths is negatively correlated to an entropy value of the first pixel at the D assumed depths. In informatics, an entropy value (which may be referred to as entropy for short) indicates a dispersion degree between a plurality of probabilities (which may also be referred to as probability values), and reflects uncertainty of an indicator. A larger the entropy value indicates greater uncertainty and a larger amount of information used to describe the uncertainty.

In this implementation, the entropy value reflects uncertainty that the D assumed depths are real depths of pixels, and also reflects encoding lengths required by all possible states at the D assumed depths. Distribution of D first probabilities may be represented by an entropy value. In other words, the entropy value may truly reflect a concentration degree of distribution of the D first probabilities. Therefore, a dispersion degree of the D first probabilities is represented by using the entropy value, and a scale-down amplitude is further determined, so that a real depth can be further avoided from a value range corresponding to the assumed depth.

In some embodiments, the method further includes: scaling down a size of a value range corresponding to D' assumed depths to obtain a size of a second range, where the second range is used as a value range of an assumed depth during depth re-prediction of a sixth pixel, a scale-down amplitude of the value range corresponding to the D' assumed depths is equal to a scale-down amplitude of a value range corresponding to the D assumed depths, the sixth pixel is a pixel in the primary view and is different from the first pixel, and D' is a positive integer greater than 1.

The value range corresponding to the D' assumed depths refers to a depth value range including the D' assumed depths, and the D' assumed depths are obtained by taking D' depth values in the value range.

A predicted depth determined by probabilities of the D' assumed depths may be used as a median value of the second range. Therefore, a range with an upper and lower limits may be determined, to re-predict the depth of the first pixel. In an example, an assumed depth with a maximum probability in the D' assumed depths may be used as the predicted depth. In another example, each of the D' assumed depths may be multiplied by its probability to obtain a depth value. D' depth values may be obtained for the D' assumed depths, and the D' depth values are summed up to obtain the predicted depth.

It may be understood that differences between real depths of different pixels in the primary view are fixed, and sizes of assumed depth ranges corresponding to the different pixels are scaled down based on a same scale-down amplitude, so that accuracy of pixel depth prediction in the primary view can be improved.

In some embodiments, the scale-down amplitude of the value range corresponding to the D assumed depths is negatively correlated to a dispersion degree between the probabilities of the D assumed depths, and is negatively correlated to a dispersion degree between probabilities of the D' assumed depths.

In this embodiment, the scale-down amplitude is constrained by the dispersion degrees corresponding to the different pixels in the primary view. That is, when the scale-down amplitude is set, the dispersion degrees corresponding to the different pixels in the primary view may be comprehensively considered, so that reasonableness of the scale-down amplitude can be improved.

In some embodiments, the scale-down amplitude of the value range corresponding to the D assumed depths is negatively correlated to an entropy value of the first pixel at the D assumed depths and is negatively correlated to an entropy value of the sixth pixel at the D' assumed depths.

According to a second embodiment, an embodiment of this application provides an image depth prediction apparatus, including: an obtaining unit, configured to obtain a primary view and a first secondary view, where the primary view and the first secondary view are images photographed by a camera facing a first object at different angles, the primary view includes a first pixel, the first pixel corresponds to a second pixel at a first assumed depth, and the second pixel is located on the first secondary view; an updating unit, configured to update feature information of the second pixel based on the feature information of the second pixel and feature information of at least one third pixel, where the at least one third pixel is located on a connection line between the second pixel and a fourth pixel, the fourth pixel is a pixel that corresponds to the first pixel at a second assumed depth and that is on the first secondary view, the second assumed depth and the first assumed depth are adjacent in preset D assumed depths, and D is a positive integer greater than 1; and an acquiring unit, configured to obtain a probability of the first assumed depth based on feature information of the first pixel and the updated feature information of the second pixel, where the probability of the first assumed depth indicates a possibility that the first assumed depth is a real depth of the first pixel.

In some embodiments, the update unit is further configured to update feature information of the fourth pixel based on the feature information of the fourth pixel and feature information of at least one fifth pixel, where the at least one fifth pixel is located on a connection line between the second pixel and the fourth pixel; and the acquiring unit is further configured to obtain a probability of the second assumed depth based on the feature information of the first pixel and the updated feature information of the fourth pixel, where the probability of the second assumed depth indicates a possibility that the second assumed depth is the real depth of the first pixel.

In some embodiments, the at least one fifth pixel and the at least one third pixel are different from each other, and the at least one fifth pixel is closer to the fourth pixel than the at least one third pixel; or a pixel included in the at least one fifth pixel but not included in the at least one third pixel is closer to the fourth pixel than a pixel included in the at least one third pixel but not included in the at least one fifth pixel.

In some embodiments, a union of the at least one fifth pixel and the at least one third pixel includes all pixels on the connection line between the second pixel and the fourth pixel.

In some embodiments, the apparatus further includes a scale-down unit, configured to scale down a size of a value range corresponding to the D assumed depths to obtain a size of a first range, where the first range is used as a value range of an assumed depth during depth re-prediction of the first pixel.

In some embodiments, a scale-down amplitude of the value range corresponding to the D assumed depths is negatively correlated to an entropy value of the first pixel at the D assumed depths.

In some embodiments, the scale-down unit is further configured to scale down a size of a value range corresponding to D' assumed depths to obtain a size of a second range, where the second range is used as a value range of an assumed depth during depth re-prediction of a sixth pixel, a scale-down amplitude of the value range corresponding to the D' assumed depths is equal to a scale-down amplitude of a value range corresponding to the D assumed depths, the sixth pixel is a pixel in the primary view and is different from the first pixel, and D' is a positive integer greater than 1.

In some embodiments, the scale-down amplitude of the value range corresponding to the D assumed depths is negatively correlated to an entropy value of the first pixel at the D assumed depths and is negatively correlated to an entropy value of the sixth pixel at the D' assumed depths.

According to a third embodiment, an embodiment of this application further provides an electronic device, including a processor and a memory, where the memory is configured to store a computer program, and the processor is configured to execute the computer program, to implement the method provided in the first embodiment.

According to a fourth embodiment, an embodiment of this application provides a computer storage medium, where the computer storage medium stores a computer program, and when the computer program is executed by a processor, the method provided in the first embodiment is implemented.

According to a sixth embodiment, an embodiment of this application provides a computer program product, including a program used to implement the method provided in the first embodiment.

According to the image depth prediction method and the electronic device provided in embodiments of this application, features of pixels of non-sampling points on an epipolar line may be aggregated to features of nearby sampling points, so that depth prediction can be performed by using features of more pixels on the epipolar line without setting a larger quantity of assumed depths, thereby improving accuracy of depth prediction.

BRIEF DESCRIPTION OF DRAWINGS

FIG. 7A and FIG. 7B are a flowchart of an image depth prediction method according to an embodiment of this application;

FIG. 9 is a flowchart of an image depth prediction method according to an embodiment of this application;

FIG. 10 is a schematic block diagram of an image depth prediction apparatus according to an embodiment of this application.

DESCRIPTION OF EMBODIMENTS

The following describes technical solutions of embodiments in this application with reference to accompanying drawings. It is clearly that embodiments described in this specification are merely a part rather than all of embodiments of this application.

Figure 1:
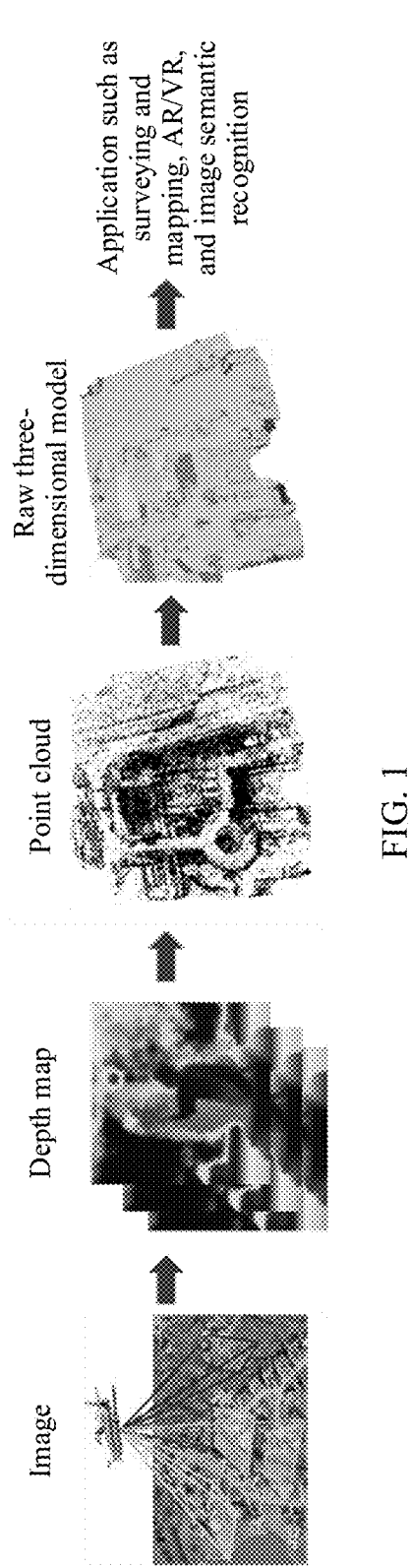
FIG. 1 is a schematic flowchart of three-dimensional reconstruction.

Multi-view stereo, which may also be referred to as multi-view matching, belongs to the multi-view stereoscopic geometry field, and is used to calculate, pixel by pixel, object points corresponding to or represented by pixels (or pixel points) in an image when a camera pose (a posture and a location in three-dimensional space) is known, to obtain a three-dimensional point cloud on an object surface (refer to FIG. 1). In a multi-view stereo process, depth prediction may be performed based on an RGB image to obtain a depth map, and pixels on the depth map are converted into point clouds. The point cloud may be converted into a mesh, to further simplify detail information of the image and obtain a raw three-dimensional model, thereby completing three-dimensional reconstruction. The raw three-dimensional model is a three-dimensional model, and may be used for surveying and mapping, AR, VR, image semantic recognition, and the like.

An object point corresponding to a pixel refers to a three-dimensional point in the real world corresponding to the pixel. It may be understood that the image is an image of an object in the real world, and the pixel is an image of a point (that is, an object point) on the object. In the multi-view stereo technology, depth prediction refers to predicting an image depth based on a camera parameter and information of an RGB image itself. The depth map is an image with a pixel depth. The pixel depth represents a vertical distance between a plane of a recorded image and an object represented by the pixel. For example, the plane of the recorded image may be a focal plane of the camera. The focal plane is a plane in which a focal point of the camera is located and that is perpendicular to an optical axis of the camera. The point cloud, that is, a three-dimensional point cloud, is a data set of points in a coordinate system. A point includes information such as three-dimensional coordinates (X, Y, Z), colors, classification values, intensity values, and time. The raw three-dimensional model is a three-dimensional model obtained by further simplifying image details after the point cloud is converted into the mesh.

For multi-view stereo, depth prediction has two manners: single-phase depth prediction and multi-phase depth prediction.

A basic process of the single-phase depth prediction is: determining a camera geometric relationship between a primary view and a secondary view based on the camera parameter (a camera extrinsic parameter matrix, a camera intrinsic parameter matrix, and the like), determining a pixel mapping relationship between the primary view and the secondary view by using a geometric position relationship, and constructing a matching cost volume accordingly to complete depth prediction. An process may include the following operations.

(1) Feature Extraction:

A two-dimensional convolutional neural network (CNN) may be used to separately perform feature extraction on a plurality of captured images, to obtain multidimensional semantic information of the images. Feature information of pixels on the image may be further obtained.

(2) Pixel Matching:

An image on which depth prediction needs to be performed in the plurality of images is used as a primary view (reference view), and several images that are in the plurality of images and that have highest association degrees with the primary view are used as secondary views (source view). Camera photographing angles of the primary view and the secondary view are different. In other words, the primary view and the secondary view are images taken by the camera facing an object at different angles.

D assumed depths are set within a depth value range R provided by a primary view camera parameter. The assumed depth refers to a depth assumed for a pixel, and may be a depth manually set, guessed, or estimated.

By using a camera geometry relationship between the primary view and the secondary view, all pixels on the primary view are respectively projected to the secondary view through the D assumed depths, to obtain sampling points (that is, pixels on the secondary view corresponding to pixels on the primary view at the assumed depth). In this way, each pixel in the primary view obtains D sampling points in each secondary view. The D sampling points corresponding to a same pixel in the primary view based on the geometric relationship are distributed on a same epipolar line. The epipolar line refers to an intersection line between a polar plane and the secondary view formed by a connection line between the object point and a camera center (focus) of the primary view and a camera center (focus) of the secondary view.

Then, for a pixel in the primary view, a feature matching relationship (cost) or a similarity between the pixel and the D sampling points may be separately calculated, to obtain D relationship sequences or D similarities. The D similarities of the pixel constitute a matching cost volume of the pixel, and a set of matching cost volumes of all pixels in the primary view is referred to as a matching cost volume of the primary view. When there are a plurality of secondary views, the primary view and each secondary view form a primary view matching cost volume. After primary view matching cost volumes corresponding to different secondary views are aggregated in a manner such as weighted summation, a final matching cost volume of the primary view is obtained. The matching cost volume represents a depth matching relationship between the primary view and all secondary views.

(3) Regularization:

Numerical distribution of matching cost volumes of different pixels in the primary view matching cost volumes obtained in operation (2) differs greatly, and is only a matching relationship between pixels. Generally, information extraction and smoothing processing may be performed on the matching cost volume of the primary view by using a 3D convolutional neural network (3D CNN), and this process may be referred to as regularization.

(4) Depth Prediction:

The matching cost volume of the primary view after regularization in operation (3) may be calculated by using a softmax activation function to obtain prediction probability values of the primary view pixels at the preset D assumed depths. A set including the prediction probability values at the D assumed depths may be referred to as a probability volume, which represents normalized matching probability values of each pixel in the primary view at different assumed depths. A predicted depth of each pixel in the primary view is obtained by taking a depth corresponding to a maximum probability value or calculating a depth expectation based on probability distribution, to obtain a depth image or a depth prediction image of the primary view.

In operation (2) of the single-phase depth prediction, it is assumed that a depth quantity D directly affects depth prediction precision. That is, in a case in which D is set to a larger value, an interval between adjacent assumed depth planes is small, and a depth preset granularity is finer. Therefore, higher precision may be obtained. On the contrary, the interval between the adjacent assumed depth planes is large, the depth preset granularity is rough, and the precision is reduced accordingly. However, a larger assumed depth quantity D directly leads to a linear increase of a shape size of a matching cost volume. In addition, because the 3D CNN is used in regularization, a calculation amount and calculation time consumption of regularization are greatly increased.

Therefore, multi-phase depth prediction is proposed. Based on the single-phase depth prediction, a coarse-to-fine mechanism is introduced. Feature maps of different resolutions are obtained by using a feature extraction network of an image pyramid. First, a relatively small quantity of assumed depths D1 are preset in an assumed depth value range provided by a camera parameter on a low-resolution feature map to perform coarse-grained depth prediction. Then, operations 2, 3, and 4 of the single-phase depth prediction are repeated. In the foregoing phase, a depth is predicted as a center, a smaller quantity of assumed depths $D\_2$ is used, and a smaller assumed depth interval is used to construct an assumed depth of each pixel for depth prediction. This process repeats. Because depth prediction in a subsequent phase is based on a depth predicted in a previous phase, the assumed depth value range and an assumed depth interval are scaled down while a quantity D of assumed depths is reduced, so that depth prediction precision can be continuously improved while prediction difficulty in the subsequent phase is reduced, to obtain a relatively good depth prediction result. The assumed depth value range may also be referred to as an assumed depth range, which is a length range, and a plurality of assumed depths with different depth values may be selected.

It can be learned from the foregoing description that a similarity between a pixel of the primary view and a sampling point at which the pixel is mapped to the secondary view is calculated, and a probability that a corresponding assumed depth is a real depth of the pixel of the primary view is determined based on the similarity. Because the assumed depth corresponding to each sampling point is assumed, none of these assumed depths may be a real depth of the primary view pixel, so that none of the sampling points may be a pixel actually corresponding to the primary view pixel. However, if a depth is predicted by using a similarity between these sampling points and pixels of the primary view, a real depth of the pixels of the primary view may not be accurately predicted, or prediction effect is poor.

In addition, for multi-phase depth prediction, a value range of an assumed depth used for depth prediction in a subsequent phase depends on a depth prediction result in a previous phase. In some embodiments, the value range of the assumed depth is adjusted based on the depth prediction result of the previous phase, and then is used for depth prediction of a subsequent phase. Currently, the value range of the assumed depth is adjusted by using a fixed depth scale-down amplitude. Therefore, a case in which a range is scaled down sharply may occur, so that a scaled-down range does not include the real depth. It is also possible that the range is conservative, resulting in a time-consuming calculation amount. Therefore, for multi-phase depth prediction, different scale-down amplitudes based on different situations are used to scale down the assumed depth value range.

For the foregoing case, in this embodiment of this application, the foregoing operation (2) is improved, and an image depth prediction method is provided. It may be set that a pixel A1 on a primary view A corresponds to a pixel P1 on a secondary view B at an assumed depth D1 (that is, a distance between an object point al corresponding to the pixel A1 and an image recording plane of the primary view is an assumed depth D1) (that is, when it is assumed that the distance between the object point al and the image recording plane of the primary view is the assumed depth D1, the object point al corresponds to the pixel P1, and then the pixel A1 may correspond to the pixel P1). The image recording plane may be the focal plane of the camera. The pixel P1 may be referred to as a sampling point of the pixel A1 on the secondary view B under constraint of the assumed depth D1. Features of one or more pixels close to the pixel P1 on an epipolar line may be aggregated into a feature of the pixel P1, to obtain a new feature of the pixel P1. In other words, a pooling operation may be performed by using the pixel P1 as a center, to aggregate more pixel information on the epipolar line, to obtain the new feature of the pixel P1. Then, a similarity or a matching relationship between the pixel P1 and the pixel A1 is determined based on the new feature of the pixel P1 and the feature of the pixel A1, and a probability that the assumed depth D1 is a real depth of the pixel A1 is determined accordingly, so that a probability of depth prediction can be improved.

Next, in different embodiments, the image depth prediction method provided in this embodiment of this application is described by using examples.

The image depth prediction method provided in this embodiment of this application may be performed by an electronic device. The electronic device may be any apparatus, device, platform, or device cluster that has computing and processing capabilities. For example, the electronic device may be user equipment (UE), and the user equipment may be mobile or fixed. For example, the user equipment may be a mobile phone, a tablet personal computer (TPC), a media player, a smart television, a laptop computer (LC), a personal digital assistant (PDA), a personal computer (PC), a camera, a video camera, a smartwatch, or a wearable device (WD), or the like. This is not limited in this embodiment of this application.

Figure 2:
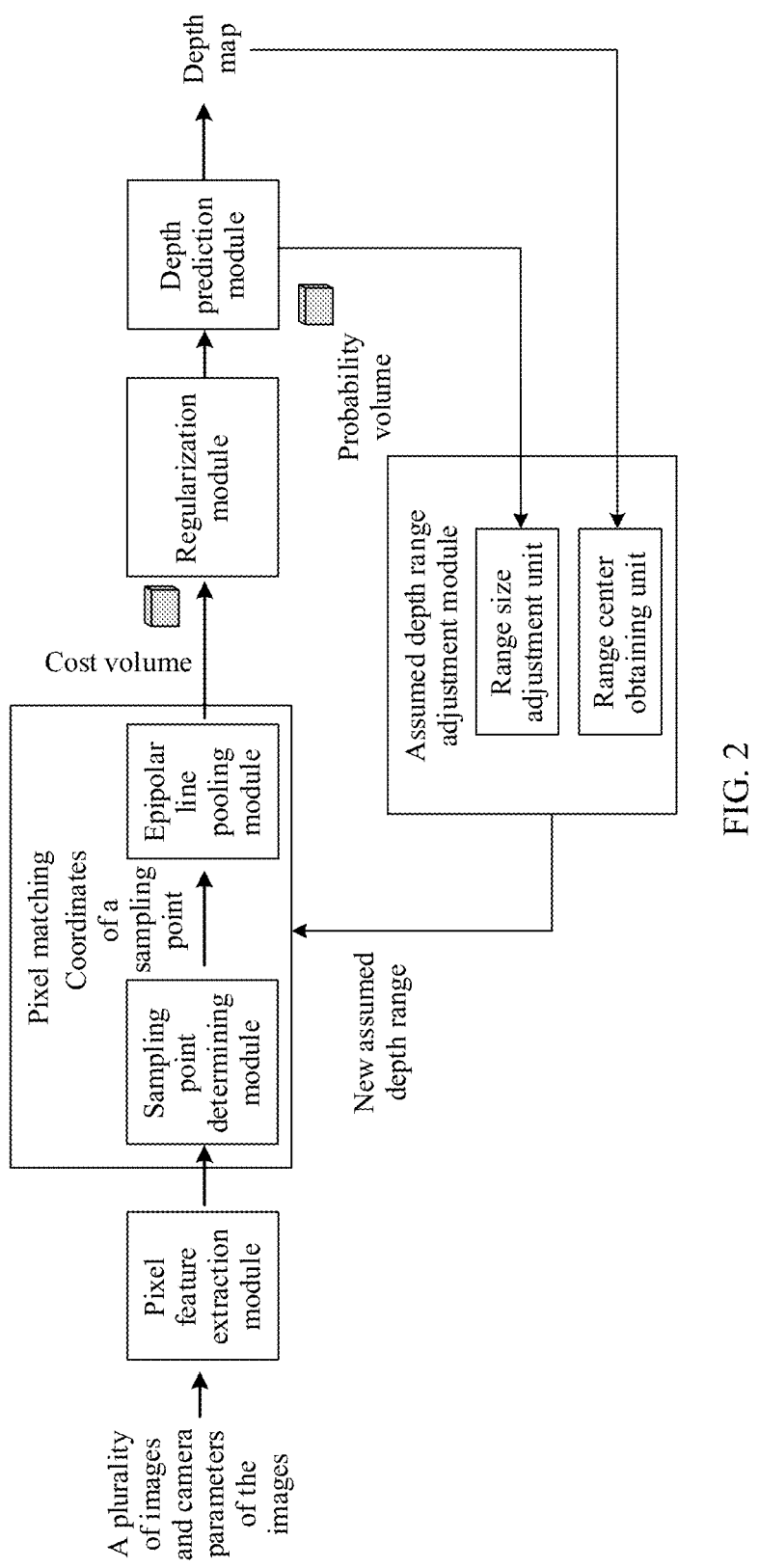
FIG. 2 is a diagram of an architecture of image depth prediction according to an embodiment of this application.

FIG. 2 shows an architecture of image depth prediction according to an embodiment of this application. The architecture may include a feature extraction module, which may obtain a plurality of images and camera parameters of each of the plurality of images. Different images in the plurality of images are photographed by the camera facing a scene object at different angles. Cameras for photographing different images may be the same or may be different. The plurality of images include a preset primary view, that is, an image whose depth needs to be predicted. For example, the primary view may be an image A. When the image A is a primary view, the image A may be referred to as a primary view A. An image other than the primary view in the plurality of images is used as a secondary view. There may be one or more secondary views of the primary view.

The feature extraction module can extract features of each pixel on the image. For example, the feature extraction module may include one or more two-dimensional convolutional layers. Multidimensional semantic information of a pixel may be obtained by performing a convolution operation on a pixel feature on the image by using convolution kernels at the one or more two-dimensional convolutional layers. The multidimensional semantic information of the pixel may also be a feature extracted by using a feature extraction operation, and may also be referred to as the feature of the pixel.

A sampling point determining module may obtain a maximum possible depth and a minimum possible depth of a pixel A1 in the primary view A. The maximum possible depth refers to a maximum possible depth value of the pixel A1. That is, the real depth of the pixel A1 is not greater than the maximum possible depth. The minimum possible depth refers to a minimum possible depth value of the pixel A1. That is, the real depth of the pixel A1 is not less than the minimum possible depth. For a process of determining the maximum possible depth and the minimum possible depth of the pixel, refer to descriptions in the conventional technology. Details are not described herein again. Therefore, the sampling point determining module may obtain an initial assumed depth value range of the pixel A1, where an upper limit of the initial assumed depth value range is the maximum possible depth value of the pixel A1, and a lower limit is the minimum possible depth value of the pixel A1. In the initial assumed depth value range, D assumed depths may be set. Depth values of different assumed depths in the D assumed depths are different.

The sampling point determining module may further obtain camera parameters of the primary view A and the secondary view thereof. The camera parameters of the image may include an extrinsic parameter matrix and an intrinsic parameter matrix of the camera. The extrinsic parameter matrix of the camera indicates a position, a posture, and the like of the camera. The intrinsic parameter matrix of the camera is used to represent a relationship between a camera coordinate system and an image coordinate system, and the like. Therefore, the sampling point determining module may determine a pixel P1 on a secondary view B by using a homography transformation (homography) algorithm and based on an assumed depth d1 in the D assumed depths of the pixel A1, coordinates of the pixel A1 in the primary view, a camera parameter of the primary view, and a camera parameter of a secondary view B. The pixel P1 may be referred to as a sampling point P1, or a sampling point P1 of the pixel A1 at the assumed depth d1. D sampling points may be separately determined for the D assumed depths. In homography transformation, the coordinates of the pixel A1 in the primary view may be converted into coordinates of an object point in a camera coordinate system at the assumed depth, and then the coordinates of the object point in the camera coordinate system are converted into pixel coordinates in the secondary view. A pixel corresponding to the pixel coordinates is a sampling point or a pixel corresponding to the pixel A1 in the secondary view at the assumed depth. For an implementation process of the homography transformation, refer to descriptions in the conventional technology. Details are not described herein again.

Figure 3:
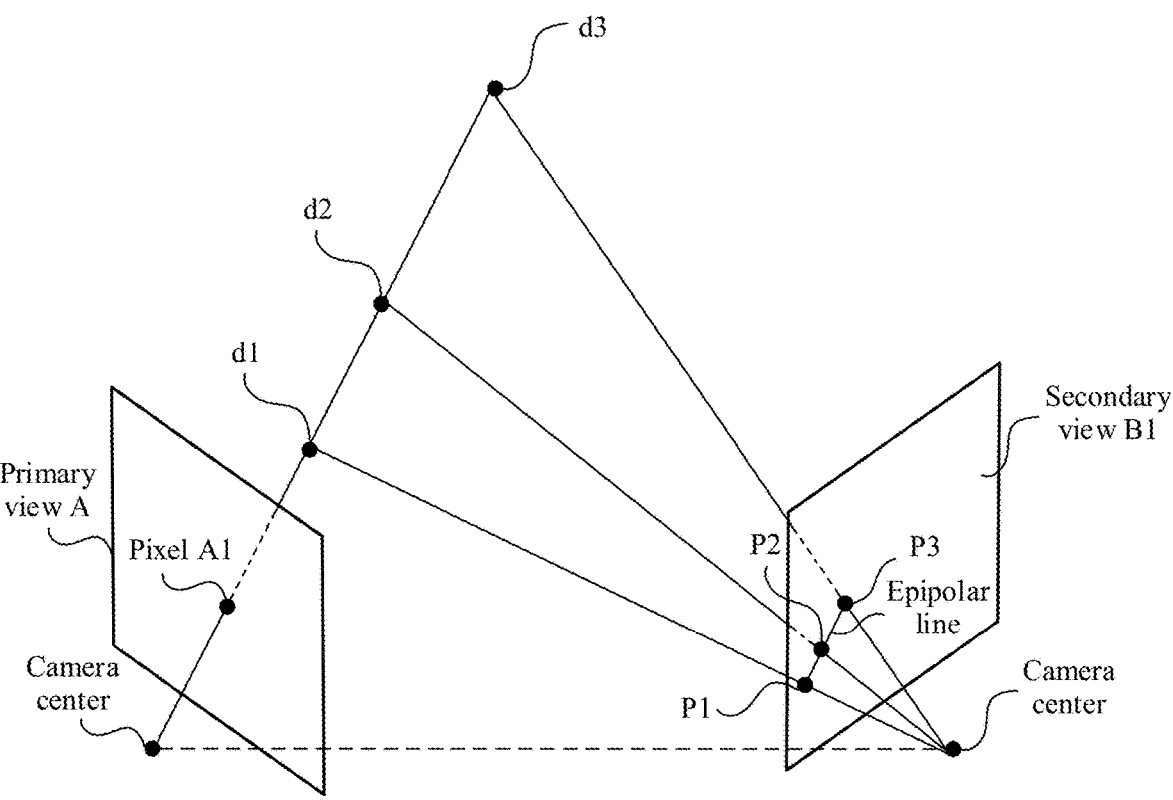
FIG. 3 is a schematic diagram of a mapping relationship between a primary view pixel and a secondary view at different assumed depths according to an embodiment of this application.

In some embodiments, refer to FIG. 3. D may be set to 3, and three assumed depths are respectively an assumed depth d1, an assumed depth d2, and an assumed depth d3. At the three assumed depths, three sampling points shown in FIG. 4 may be determined: a sampling point P1, a sampling point P2, and a sampling point P3. According to computational graphics or epipolar geometry, the three sampling points are located on an epipolar line. The epipolar line is an intersection line between a polar plane and the secondary view B1 determined by the pixel A1, a camera center of the primary view A, and a camera center of the secondary view.

The sampling point determining module may transfer coordinates of the determined D sampling points to an epipolar line pooling module. The epipolar line pooling module may determine the epipolar line (the epipolar line may be determined by using a connection line between any two sampling points in the D sampling points based on the epipolar geometry) based on the coordinates of the D sampling points, and determine a spacing between adjacent sampling points in the D sampling points. The spacing between the sampling points is a spacing in a direction of the epipolar line. In some embodiments, a quantity of pixels that are located between two adjacent sampling points and that are located on the epipolar line may be determined. The quantity of pixels indicates the spacing.

The epipolar line pooling module may determine a size of a pooling kernel of a current sampling point based on a spacing between the current sampling point (that is, a sampling point that is currently analyzed or concerned) and adjacent sampling points on two sides of the current sampling point. The pooling kernel may be understood as a pooling window, and a pooling operation may be performed on a feature of a pixel that is covered by the pooling kernel of the current sampling point and that is located on the epipolar line, to obtain a new feature of the current sampling point. The pooling operation may be understood as an information aggregation operation or an information convergence operation. It may be understood that a form of the pixel feature extracted by the feature extraction module is usually an eigenvalue or a feature matrix. The pooling operation may be an operation of averaging a plurality of eigenvalues or feature matrices, or may be an operation of obtaining a maximum value, or may be a weighted summation operation, or the like. Details are not listed one by one herein. For an implementation process of the pooling operation, refer to descriptions in the conventional technology. Details are not described herein again.

Next, with reference to FIG. 3, FIG. 4A, FIG. 4B, and FIG. 4C, a process of determining a pooling kernel size of a current sampling point is described by using an example.

A sampling point P2 shown in FIG. 3 may be set as a current sampling point, and adjacent sampling points on two sides of the sampling point P2 are respectively a sampling point P1 and a sampling point P3. An interval between the sampling point P2 and the sampling point P1 is indicated or represented by $\Delta P1$, and an interval between the sampling point P2 and the sampling point P3 is indicated or represented by $\Delta P2$.

Figure 4A:
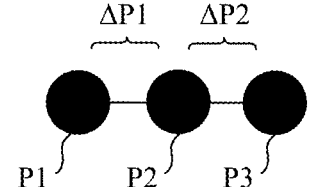
FIG. 4A is a schematic diagram of a spacing between adjacent sampling points according to an embodiment of this application.

In an example, as shown in FIG. 4A, it may be set that a size of $\Delta P1$ is less than one pixel, and a size of $\Delta P2$ is also less than one pixel. That is, the sampling point P1, the sampling point P2, and the sampling point P3 are three pixels that are closely adjacent in sequence on the secondary view B. In this case, pooling processing is not performed on the sampling point P2.

Figure 4B:
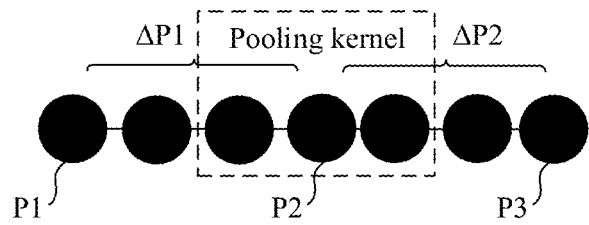
FIG. 4B is a schematic diagram of a spacing between adjacent sampling points according to an embodiment of this application.

In an example, as shown in FIG. 4B, a size of $\Delta P1$ may be set to two pixels, that is, the sampling point P1 and the sampling point P2 are separated by two pixels on the epipolar line. A size of $\Delta P2$ may be further set to two pixels, that is, the sampling point P3 and the sampling point P2 are separated by two pixels on the epipolar line. A pooling kernel shown in FIG. 4B may be set, so that the pooling kernel may cover a pixel that is in $\Delta P1$ and that is close to the sampling point P2, and may cover a pixel that is in $\Delta P2$ and that is close to the sampling point P2. A pooling operation is performed on features of pixels (the pixel that is in $\Delta P1$ and that is close to the sampling point P2, the pixel that is in $\Delta P2$ and that is close to the sampling point P2, and the sampling point P2) covered by the pooling kernel, so that a feature of the pixel that is in $\Delta P1$ and close to the sampling point P2 and a feature of the pixel that is in $\Delta P2$ and close to the sampling point P2 can be aggregated to the sampling point P2, to obtain a new feature of the sampling point P2. It may be understood that both the pixel that is in $\Delta P1$ and that is close to the sampling point P2 and the pixel that is in $\Delta P2$ and that is close to the sampling point P2 may be a pixel or a feature point corresponding to the pixel A1 at a real depth. Feature information of the pixel A1 is aggregated into a new feature of the sampling point P2, so that accuracy of depth prediction can be improved.

Similarly, a pixel that is in ΔP1 and that is close to the sampling point P1 may be aggregated to the sampling point P1 in a pooling process of the sampling point P1. A pixel that is in ΔP2 and that is close to the sampling point P3 may be aggregated to the sampling point P3 in a pooling process of the sampling point P3, to improve accuracy of depth prediction.

Figure 4C:
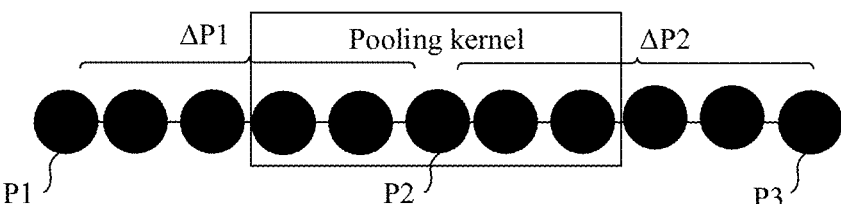
FIG. 4C is a schematic diagram of a spacing between adjacent sampling points according to an embodiment of this application.

In an example, as shown in FIG. 4C, the size of ΔP1 may be set to four pixels, that is, the sampling point P1 and the sampling point P2 are separated by four pixels on the epipolar line. The size of ΔP2 may be further set to four pixels, that is, the sampling point P3 and the sampling point P2 are separated by four pixels on the epipolar line. A pooling kernel shown in FIG. 4C may be set, so that the pooling kernel may cover two pixels that are in ΔP1 and that are close to the sampling point P2, and may cover two pixels that are in ΔP2 and that are close to the sampling point P2. A pooling operation is performed on features of pixels (the two pixels that are in ΔP1 and that are close to the sampling point P2, the two pixels that are in ΔP2 and that are close to the sampling point P2, and the sampling point P2) covered by the pooling kernel, so that features of that are in ΔP1 and that are close to the sampling point P2 and features of the two pixels that are in ΔP2 and that are close to the sampling point P2 can be aggregated to the sampling point P2, to obtain a new feature of the sampling point P2. It may be understood that both the two pixels that are in ΔP1 and that are close to the sampling point P2 and the two pixels that are in ΔP2 and that are close to the sampling point P2 may be pixels or feature points corresponding to the pixel A1 at a real depth. Feature information of the pixel A1 is aggregated into the new feature of the sampling point P2, so that accuracy of depth prediction can be improved.

Similarly, two pixels that are in ΔP1 and that are close to the sampling point P1 may be aggregated to the sampling point P1 in the pooling process of the sampling point P1. Two pixels that are in ΔP2 and that are close to the sampling point P3 may be aggregated to the sampling point P3 in the pooling process of the sampling point P3, to improve accuracy of depth prediction.

The determining the size of the current sampling point pooling kernel is described above by using an example with reference to FIG. 4A to FIG. 4C, and is not limited herein. In conclusion, the feature of the pixel that is close to the current sampling point and that is in pixels spaced between the current sampling point and its adjacent sampling point may be aggregated into the feature of the current sampling point, to form a new feature of the current sampling point. In some embodiments, the pixel that is close to the current sampling point may be some pixels in a plurality of pixels spaced between the current sampling point and a sampling point adjacent to the current sampling point, and the some pixels are closer to the current sampling point than other pixels in the plurality of pixels. In some embodiments, the pixel that is close to the current sampling point may refer to all pixels in pixels spaced between the current sampling point and the sampling point adjacent to the current sampling point.

In some embodiments, an assumed depth d3 corresponding to the sampling point P3 may be set as a maximum possible depth. In this case, a pooling operation may be performed on a feature of a pixel that is close to the sampling point P3 and the feature of the sampling point P3 in pixels between the sampling point P3 and the sampling point P2, to obtain a new feature of the sampling point P3.

In some embodiments, an assumed depth d1 corresponding to the sampling point P1 may be set as a minimum possible depth. In this case, a pooling operation may be performed on a feature of a pixel that is close to the sampling point P1 and the feature of the sampling point P1 in pixels between the sampling point P1 and the sampling point P2, to obtain a new feature of the sampling point P1.

According to the foregoing solution, a feature of a pixel near a sampling point and located on the epipolar line may be aggregated with the feature of the sampling point, to obtain a new feature of the sampling point. A similarity between the sampling point and the pixel A1 may be calculated based on the new feature of the sampling point and the feature of the pixel A1.

When there are a plurality of secondary views of the primary view A, for other secondary views except the secondary view B1, homography transformation may be performed by using the foregoing D assumed depths, and D sampling points are determined on each secondary view. For the D sampling points on each secondary view, the foregoing dynamic pooling operation is performed to obtain a new feature of each sampling point. Then, pixel degrees of the sampling point and the pixel A1 are respectively calculated based on the new feature of each sampling point and the feature of the pixel A1. In this way, for a secondary view, D similarities may be obtained. Different similarities in the D similarities respectively correspond to different assumed depths in the D assumed depths.

Similarities of all secondary views corresponding to a same assumed depth may be aggregated, for example, an average operation, a maximum operation, or a weighted sum operation. In this way, the similarity corresponding to each secondary view at the same assumed depth may be aggregated together to obtain a comprehensive similarity of each secondary view at the same assumed depth. For the D assumed depths, D comprehensive similarities may be obtained. Different similarities in the D comprehensive similarities respectively correspond to different assumed depths in the D assumed depths. The D comprehensive similarities may constitute a matching cost volume of the pixel A1 in a current prediction phase.

A matching cost volume of another pixel on the primary view A may be determined by referring to a manner of determining the matching cost volume of the pixel A1.

Refer to FIG. 2. In some embodiments, the epipolar line pooling module may transfer a matching cost volume of each pixel in the primary view A to the regularization module. In an example, the regularization module may be a 3D convolutional neural network, and may perform information extraction and smoothing processing on a matching cost volume of each pixel in the primary view. For details, refer to the description in the conventional technology. Details are not described herein again.

For a pixel in the primary view A, for example, the pixel A1, a matching cost volume of the pixel or a regularized matching cost volume of the pixel may be converted into a probability volume in the depth prediction module. As described above, the matching cost volume of the pixel A1 includes the D similarities (there is only one secondary view of the primary view) or the D comprehensive similarities (there are a plurality of secondary views of the primary view). The D similarities or the D comprehensive similarities may be mapped to D probability values by using a normalization function (for example, a softmax function). The D probability values form a probability volume of the pixel A. Each probability value represents a probability that an assumed depth corresponding to the probability value is like a real depth of the pixel A1. That is, a larger probability value in the D probability values indicates a higher probability that the assumed depth corresponding to the probability value is the real depth of the pixel A1, or a higher probability that the real depth of the pixel A1 is the assumed depth corresponding to the probability value.

Refer to a manner of determining the probability volume of the pixel A1, probability volumes of other pixels in the primary view may be determined. Details are not described herein again.

Still refer to FIG. 2, the depth prediction module may generate a depth map of the primary view based on a probability volume of each pixel in the primary view. In the depth map, a depth of each pixel may be a depth corresponding to a maximum probability value in a probability volume of the pixel.

In some embodiments, the architecture shown in FIG. 2 further includes a range adjustment module. The range adjustment module may include a range size adjustment unit. The depth prediction module may transfer the probability volume of the primary view pixel to the range size adjustment unit.

In some embodiments, the range size adjustment unit may determine a scale-down amplitude based on a dispersion degree of probability values in the probability volume of the pixel. The scale-down amplitude is used to scale down an assumed depth value range, to obtain a new assumed depth value range. The scale-down amplitude refers to a difference between a size of an assumed depth range before scaling down and a size of an assumed depth range after scaling down. A larger scale-down amplitude indicates a larger difference between the size of the assumed depth range before scaling down and the size of the assumed depth range after scaling down. A smaller scale-down amplitude indicates a smaller difference between a size of an assumed depth range before reduction and a size of an assumed depth range after scaling down.

In this embodiment of this application, a dispersion degree of probability values in the probability volume of the pixel is negatively correlated to the scale-down amplitude. It may be understood that a higher dispersion degree of the plurality of probability values indicates a smaller difference between the plurality of probability values, and more dispersed distribution, or a shorter distribution curve. This indicates that a maximum probability value in the plurality of probability values is small. That is, in a case in which the dispersion degree of a plurality of probability values is relatively high, if an assumed depth corresponding to the maximum probability value is used as a predicted depth, a prediction result is unreliable or nonconfidence is high. The nonconfidence is opposite to confidence. The higher the nonconfidence, the lower the confidence. Therefore, when the dispersion degree of the probability values in the probability volume of the pixel is high, the assumed depth value range sampled in the current prediction phase may be scaled down slightly, to avoid excluding a true value (the real depth of the pixel in the primary view) from the scaled-down assumed depth value range. In other words, a probability value in the probability volume of the pixel has a high dispersion degree and a small scale-down amplitude.

In an illustrative example of this embodiment, an entropy value $E_{pixel}$ of a pixel may be calculated based on a dispersion degree of probability values in a probability volume of a pixel p, where the entropy value is negatively correlated to the dispersion degree of the probability values in the probability volume. In an example, the entropy value $E_{pixel}$ of the pixel p may be calculated by using formula (4).

$$E_{pixel} = -\sum_{d=1}^{D} prob_d(p) * \log_D prob_d(p) \qquad (4)$$

D is a quantity of assumed depths in prediction in this phase, and $prob_d(p)$ is a probability value that a real depth of the pixel p is an assumed depth d. The entropy value $E_{pixel}$ represents an encoding length required for describing all possible states of the pixel p at D assumed depths.

In some embodiments, a scale-down amplitude corresponding to the pixel p may be determined based on the entropy value of the pixel p. The scale-down amplitude is negatively correlated with the entropy value.

It may be understood that depths of different pixels on the primary view may be different, but a difference between depths of different pixels is fixed. For example, a depth of a pixel A1 may be set to d1, and a depth of a pixel A2 may be set to d1+1. If an assumed depth value range of the pixel A1 is [d1−Δd, d1+Δd], correspondingly, an assumed depth value range of the pixel A2 should also be [d1+1−Δd, d1+1+Δd]. That is, the size of the assumed depth value range of the pixel A1 should be consistent with the size of the assumed depth value range of the pixel A2. In this way, comprehensive accuracy of a depth prediction result of each pixel in the primary view can be ensured or improved. Therefore, in this embodiment of this application, assumed depth value ranges of different pixels in the primary view may be scaled down by using a same scale-down amplitude.

In some embodiments, assumed depth value ranges of the pixel p and other pixels in the primary view may be adjusted based on a scale-down amplitude corresponding to the pixel p, so that assumed depth ranges of different pixels in the primary view may be scaled down based on a same proportion.

Figure 5:
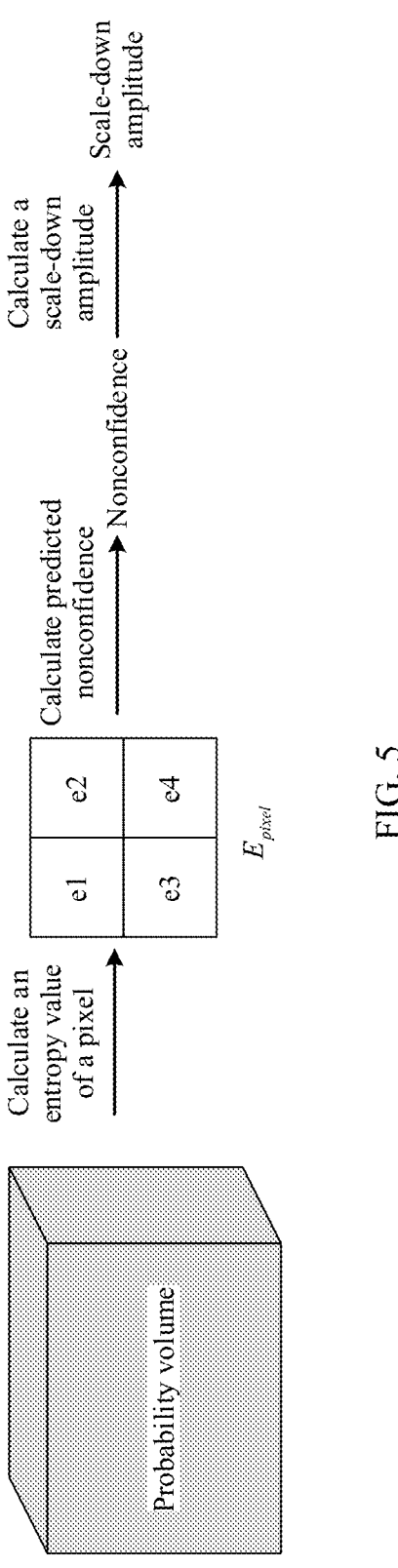
FIG. 5 is a flowchart of determining a scale-down amplitude according to an embodiment of this application.

In some embodiments, refer to FIG. 5. An entropy value (for example, an entropy value e1, an entropy value e2, an entropy value e3, and an entropy value e4 shown in FIG. 5) of each of a plurality of pixels in the primary view may be calculated, and an entropy average value $\overline{E_{pixel}}$ of the entropy values of the plurality of pixels is calculated. The plurality of pixels may be some pixels in the primary view, or may be all pixels in the primary view.

Nonconfidence may be calculated based on the entropy average value $\overline{E_{pixel}}$. In an example, the nonconfidence may be calculated by using formula (5).

$$noncondidence = D^{\overline{E_{pixel}}} \qquad (5)$$

D is a quantity of assumed depths in prediction in this phase.

The scale-down amplitude may be determined based on the nonconfidence. For example, the scale-down amplitude may be represented by a ratio. A size of a new assumed depth value range obtained by multiplying a size of an assumed depth range at a current phase by the ratio is used as a size of an assumed depth value range for depth prediction in a next phase. It may be understood that a value of the ratio is inversely proportional to the scale-down amplitude. A smaller value of the ratio indicates a larger scale-down amplitude. A larger value of the ratio indicates a smaller scale-down amplitude.

In an example, the ratio may be calculated by using formula (6).

$$\text{Ratio} = \frac{\lambda * \text{confidence}}{D} = \lambda * \frac{D^{\overline{Epixel}}}{D} \qquad (6)$$

By using the foregoing solution, a scale-down amplitude of the size of the assumed depth value range may be determined, and then a size of a new assumed depth value range may be determined based on the size of the assumed depth value range and the scale-down amplitude in this phase.

For a pixel in the primary view, for example, the pixel A1, after a size of a new assumed depth range is determined, a predicted depth of the pixel A1 may be used as a median value of the new assumed depth value range, and then an assumed depth value range having an upper limit value and an lower limit value may be determined. The assumed depth value range may be used to preset the depth of the pixel A1 again.

In some embodiments, an assumed depth corresponding to a maximum probability value in the probability volume is used as the predicted depth. In some embodiments, an expected depth may be calculated in a manner of calculating a depth expectation based on probability distribution, and the expected depth may be used as a predicted depth. In some embodiments, each probability value distribution in the probability volume of the pixel A1 may be multiplied by a corresponding assumed depth, and then added, and an obtained sum of is used as the expected depth.

According to the image depth prediction method provided in this embodiment of this application, features of pixels between sampling points at different assumed depths may be aggregated into features of the sampling points, and a similarity between the sampling points and a pixel of the primary view is calculated based on the features, thereby providing depth prediction accuracy. In addition, according to the solution provided in this embodiment of this application, the scale-down amplitude may be determined based on a dispersion degree between probability values of assumed depths, so that when a prediction result is unreliable, the assumed depth range is slightly scaled down, and when a prediction result is reliable, the assumed depth range is greatly scaled down, to perform depth prediction again. This avoids exclusion of a true value and reduces calculation complexity.

Figure 6:
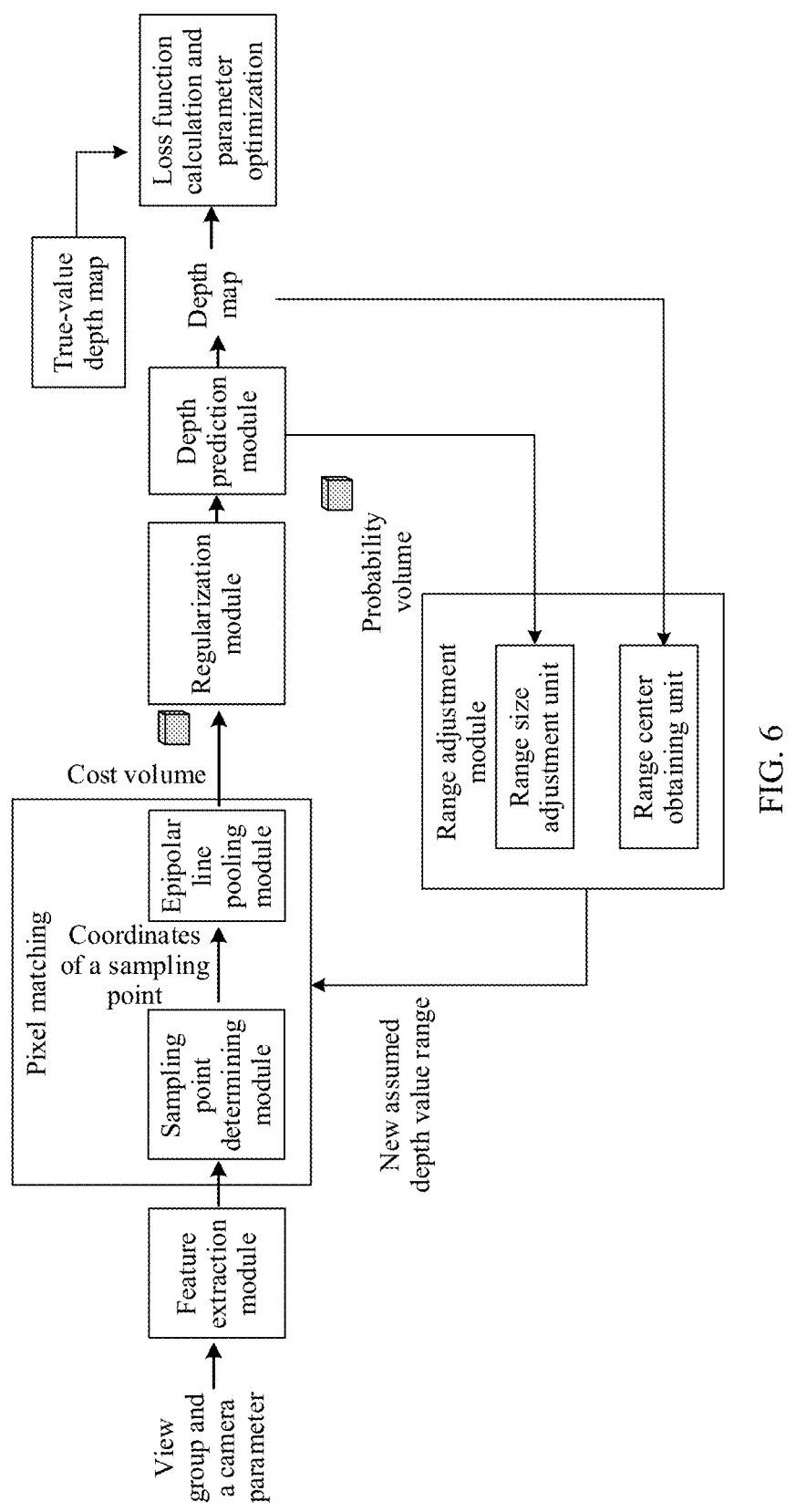
FIG. 6 is a schematic diagram of a structure of a neural network according to an embodiment of this application.

Refer to FIG. 6. In some embodiments, an embodiment of this application provides a neural network. When the neural network is executed by an electronic device, the image depth prediction method provided in embodiments of this application may be implemented. In the method, image depth prediction may be performed in a multi-phase depth prediction manner. As shown in FIG. 6, the neural network may include a feature extraction module, a sampling point determining module, an epipolar line pooling module, a regularization module, and a depth prediction module. A module in the neural network may also be referred to as a layer. For example, the feature extraction module may be referred to as a feature extraction layer, and the sampling point determining module may also be referred to as a sampling point determining layer.

Next, with reference to a training process of the neural network, functions of the modules in the neural network shown in FIG. 6 are described by using an example.

The neural network is trained in a supervised training manner. In a training process, loss supervision is performed, by using a true-value depth map (including a real depth of a pixel) of a primary view, on a depth prediction result output by the neural network. A network parameter of a module (for example, the feature extraction module or the regularization module) in the neural network is iteratively updated by using a gradient reverse transmission mechanism, until the loss converges (reaches a preset value). The network parameter of the neural network obtained through training may be stored in a hard disk drive of the electronic device, and may be used for image depth prediction.

When training data or a training a set is prepared, an image and n (n is an integer greater than or equal to 1) images that have a highest association degree with the image may be used as a view group based on a given matching relationship between images. A depth prediction object or a subject is used as a primary view, and other images are used as secondary views. Camera parameters of images in each view group are obtained as a corresponding camera parameter group. A true-value depth map corresponding to the primary view in each view group is obtained. Each piece of training data includes one view group, one corresponding camera parameter group, and one true-value depth map. All training data is stored on a hard disk drive of a server.

Next, with reference to the procedures shown in FIG. 7A and FIG. 7B, FIG. 8, and FIG. 9, functions of the modules in the neural network are described by using examples.

The training data including the view group and the camera parameters may be input into the feature extraction module. The feature extraction module may perform operation 701 to extract pixel features of images in the view group, to obtain pixel features or feature information of the primary view and the secondary view. For example, the feature extraction module may include one or more two-dimensional convolutional layers set in series, to extract a two-dimensional feature of a pixel. For example, in a training iteration, N pieces of training data (N is a preset training batch data size) may be read from the hard disk drive of the server to a computing chip (for example, a CPU, a GPU, or an Ascend chip). It may be understood that, for multi-phase depth prediction, depth prediction is performed in different phases by using image features of different scales. Therefore, the image feature extraction module may extract an image feature required in each phase of the multi-phase depth prediction. It may be set that the multi-phase depth prediction has a total of P phases (that is, depth prediction is performed for one time in each of the P phases). The feature extraction module may extract P groups of image features, where each group of image features includes image features of N primary views and secondary views corresponding to each of the N primary views. A $k^{th}$ group of image features in the P groups of image features may be used in a depth prediction process of a $k^{th}$ phase in the P phases. P is a positive integer greater than or equal to 2. k is a positive integer greater than or equal to 1, and represents a quantity of phases in a current prediction phase, that is, the $k^{th}$ phase in multi-phase prediction in the current prediction phase. As a quantity of phases in the prediction phase increases, the feature data of the image also increases step by step. k indicates a quantity of phases of the current phase. The current phase refers to a current depth prediction phase in the multi-phase depth prediction. The image feature may be a feature of a pixel on an image.

The feature extraction module may input, to the sampling point determining module, the pixel feature and the camera parameter that are extracted by the feature extraction module. The sampling point determining module may perform operation 702 to determine whether the quantity k of phases of the current phase is equal to 1. In one round of training iteration, a phase whose quantity of phases is equal to 1 refers to a first phase in the multi-phase depth prediction of the round of training iteration when iterative training is performed on the multi-phase depth prediction.

If k is equal to 1, the sampling point determining module may perform operation 703a to set Dk assumed depths based on an initial assumed depth value range and a quantity Dk of assumed depths in the current phase. Dk may be a preset value. For an execution operation of operation 703a, refer to the foregoing description of a function of the sampling point determining module shown in FIG. 2. Details are not described herein again.

If k is not equal to 1, it indicates thin the current phase is not an initial phase in the multi-phase depth prediction. In this case, the sampling point determining module may perform operation 703b to set the assumed depth based on the assumed depth value range adjusted in a previous phase and the quantity Dk of assumed depths of the current phase. The assumed depth value range adjusted in the previous phase is a new assumed depth value range determined in the previous phase. For a process of determining a new assumed depth value range, refer to the foregoing description of the function of the range adjustment module shown in FIG. 2. Details are not described herein again.

After the assumed depth is set, the sampling point determining module may perform operation 704 to determine a sampling point. Homography transformation may be used to map a pixel on the primary view to the secondary view, to obtain the sampling point. If the current prediction phase is a phase 1, an initial assumed depth value range R= [$Depth_{min}$, $Depth_{max}$] is divided into $D_1$ assumed depths $\{depth_i|i=1, 2, \ldots, D_1\}$. $Depth_{min}$ represents a minimum possible depth, and $Depth_{max}$ represents a maximum possible depth. All pixel coordinates $p_{ref}$ on the primary view may be mapped to all secondary views through homography transformation to obtain a pixel coordinate set $\{p_{src1}, p_{src2}, \ldots, p_{srcn}\}$. A coordinate set to which each pixel coordinate in the primary view is mapped on the secondary view is represented by $\{p_{src|i}|i=1, 2, \ldots, D_1\}$, and separately represent coordinates obtained through mapping according to different assumed depths $depth_i$. If the current prediction phase is that the phase k is not equal to 1, the assumed depth is set by using a new assumed depth value range Area k determined through prediction in the previous phase and a quantity $D_k$ of assumed depths of the phase k. All pixel coordinates $p_{ref}$ on the primary view is mapped to all secondary views through homography transformation to obtain a pixel coordinate set $\{p_{src1}, p_{src2}, \ldots, p_{srcn}\}$. A coordinate set to which each pixel coordinate in the primary view is mapped on the secondary view is represented by $\{p_{src|i}|i=1, 2, \ldots, D_k\}$, and separately represent coordinates obtained through mapping according to different assumed depths $\{depth_i|i=1, 2, \ldots, D_k\}$. For an implementation process of operation 704, refer to the foregoing description of the sampling point determining module shown in FIG. 2. Details are not described herein again.

The sampling point determining module may input information about a determined sampling point, for example, coordinates of the sampling point, to the epipolar line pooling module. The epipolar line pooling module may perform operation 705 to determine a spacing between adjacent sampling points. A spacing between coordinates of adjacent sampling points may be calculated based on the pixel coordinate set $\{p_{src|i}|i=1, 2, \ldots, D_k\}$ obtained in operation 704, and the spacing may be represented by $\{p_{src|i}|i=1, 2, \ldots, D_k-1\}$.

The epipolar line pooling module may further perform operation 706, to perform a pooling operation by using the coordinates of the sampling point as a center and based on the spacing between the adjacent sampling points. In some embodiments, a size of a dynamic pooling kernel may be set on an epipolar line of each secondary view by using the sampling point coordinates $\{p_{src|i}|i=1, 2, \ldots, D_k\}$ as a center and based on the sampling point spacing $\{p_{src|i}|i=1, 2, \ldots, D_k-1\}$ obtained through calculation in operation 705. A dynamic pooling operation is performed on features of pixels around the sampling point, to aggregate features of pixels around the sampling point to the feature of the sampling point, thereby implementing information aggregation. For details, refer to the foregoing description of the function of the epipolar line pooling module shown in FIG. 2.

The epipolar line pooling module may further perform operation 707 to construct a cost volume based on a pooling operation result and the feature of the pixel in the primary view. In some embodiments, after all secondary views are processed in operation 706, a sampling point feature set $\{feat_{src1}, feat_{src2}, \ldots feat_{srcn}\}$ of the secondary views may be obtained, where a sampling point feature of each secondary view may be represented by a three-dimensional tensor whose shape is $H_k*W_k*D_k$. After the pixel feature of the primary view is copied for $D_k$ times, a three-dimensional feature tensor with a same shape of $H_k*W_k*D_k$ may also be obtained. A dot product operation is performed on the pixel feature of the primary view and a sampling point feature of each secondary view to obtain a corresponding cost volume.

The epipolar line pooling module may further perform operation 708 to perform an aggregation operation (for example, taking an average value, taking a maximum value, or performing weighted summation) on each secondary view and the cost volume generated by the primary view, to obtain a final cost volume, where a shape of the cost volume may be a three-dimensional tensor $H_k*W_k*D_k$.

The epipolar line pooling module may further perform operation 709 to output an aggregated cost volume.

For a function of the epipolar line pooling module, refer to the foregoing description of the function of the epipolar line pooling module shown in FIG. 2.

The epipolar line pooling module may output the aggregated cost volume to the regularization module, and the regularization module may perform operation 710 to perform information extraction and smoothing processing on the cost volume of each primary view. For example, a 3D convolutional neural network may be used to perform information extraction and smoothing processing on the cost volume of each primary view. For details, refer to the description in the conventional technology. Details are not described herein again.

Figure 7B:
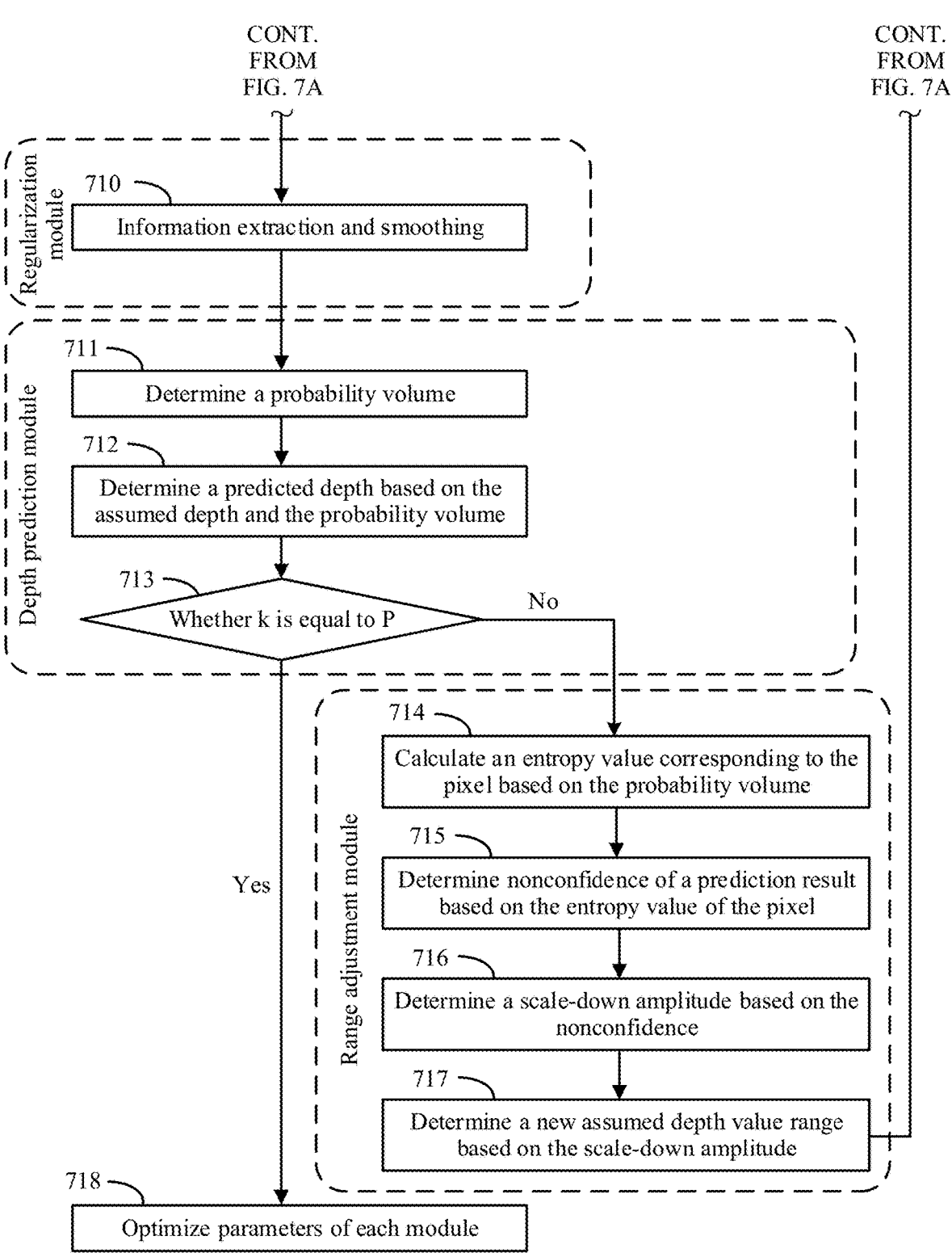

Still refer to FIG. 7A and FIG. 7B. The depth prediction module may obtain the cost volume of each primary view, and perform operation 711 to determine a probability volume of a pixel based on a cost volume of a pixel in the primary view. In some embodiments, a softmax activation function operation is performed on cost volumes of the N primary views output by the regularization module in $D_k$ dimensions ($D_k$ assumed depths), to obtain normalized probabilities probability volumes at $D_k$ assumed depths $\{depth_i|i=1, 2, \ldots, D_k\}$, where a shape of the normalized probabilities probability volumes is $H_k*W_k*D_k$.

The depth prediction module may further perform operation 712 to determine the predicted depth based on the assumed depth and the probability volume. In some embodiments, the expected depth is calculated based on $D_k$ assumed depths {depth$_l$li=1, 2, . . . , $D_k$} and the probability volume (for details, refer to the foregoing description), to obtain the predicted depth of each pixel. A predicted depth shape of a primary view pixel is $H_k*W_k$.

The depth prediction module may further perform operation 713 to determine whether k is equal to P. P is a preset value, and represents a quantity of phases of the multi-phase depth prediction, that is, a $P^{th}$ phase is a last phase of the multi-phase depth prediction.

If k is not equal to P (that is, k is less than P), a depth prediction module 713 may input the probability volume and the predicted depth to the range adjustment module.

Still refer to FIG. 7A and FIG. 7B. The range adjustment module may perform operation 714, and may calculate, based on the probability volume of the pixel in the primary view, an entropy value corresponding to the pixel. In some embodiments, entropy calculation in $D_k$ dimensions may be performed on the probability volume (including $D_k$ probability values, where the $D_k$ probability values are in a one-to-one correspondence with $D_k$ assumed depths) determined in operation 711 based on the foregoing formula (4), to obtain an entropy value $E_{pixel}$ corresponding to pixel, or an entropy value $E_{pixel}$ of a pixel granularity. Entropy values of pixels in a primary view form a matrix whose shape is $H_k*W_k$. For details, refer to the foregoing description of the function of the range size adjustment unit shown in FIG. 2. Details are not described herein again.

The range adjustment module may further perform operation 715 to determine nonconfidence of a prediction result based on the entropy value of the pixel. The entropy values $E_{pixel}$ of the pixel granularity determined in operation 714 may be averaged according to the formula (5) shown above, and then used as an exponent of an assumed depth quantity $D_k$ in the current phase. After an operation, the nonconfidence of the depth result in the current phase is obtained, which may be represented by nonconfidence$_k$.

The range adjustment module may further perform operation 716 to determine the scale-down amplitude based on the nonconfidence. The scale-down amplitude may be calculated according to the formula (6) shown above, and is represented by Ratio$_k$.

The range adjustment module may further perform operation 717 to determine a new assumed depth value range based on the scale-down amplitude. The size of the assumed depth value range in the current phase may be multiplied by a scale-down amplitude Ratio$_k$, to obtain a size Area$_{k+1}$ of a new assumed depth value range. After the size of the new assumed depth value range is determined Area$_{k+1}$, the prediction result or the predicted depth in the current phase may be used as a median value of the new assumed depth value range. Therefore, the new assumed depth value range may be determined. The new assumed depth value range may also be referred to as an assumed depth value range in a next phase, and is used for image depth prediction in the next phase. That is, a value of an assumed depth used for image depth prediction in the next phase is obtained in a new assumed depth value range.

In an example, the size of the assumed depth value range in the current phase may be a difference obtained by subtracting a minimum assumed depth depth$_{D_1}$ from the maximum assumed depth depth$_{D_k}$ in the current phase. Therefore, formula (7) may be used to calculate the size of the new assumed depth value range Area$_{k+1}$.

$$\text{Area}_{k+1} = (\text{depth}_{D_k} - \text{depth}_{D_1}) * \text{Ratio}_k \qquad (7)$$

Operation 714 to operation 717 may be performed by the range size adjustment unit in the range adjustment module.

The range adjustment module may output the determined new assumed depth value range to the sampling point determining module, so that the sampling point determining module sets the assumed depth from the new assumed depth value range in the next phase.

Still refer to FIG. 7A and FIG. 7B. If k=P, that is, the current phase is the last phase of the multi-phase depth prediction, a parameter of a module in the neural network may be optimized in operation 718.

In some embodiments, when k is less than P, operation 702 to operation 717 are repeatedly performed until a predicted depth map {Depth$_{pred|k}$, k=1, 2, . . . , P} corresponding to each primary view is output in all prediction phases. If there are the N primary views, there are N groups of predicted depth maps. A difference between the predicted depth map and a true-value depth map is calculated as a loss based on true-value depth maps corresponding to the N primary views, and a network parameter of a module (for example, the feature extraction module or the regularization module) in the neural network is updated by using a gradient reverse transmission mechanism.

Operation 702 to operation 717 are repeatedly performed until a loss converges, and the parameter of the module (for example, the feature extraction module and the regularization module) of a neural module are stored in a hard disk drive of a server for use in image depth prediction.

Figure 8:
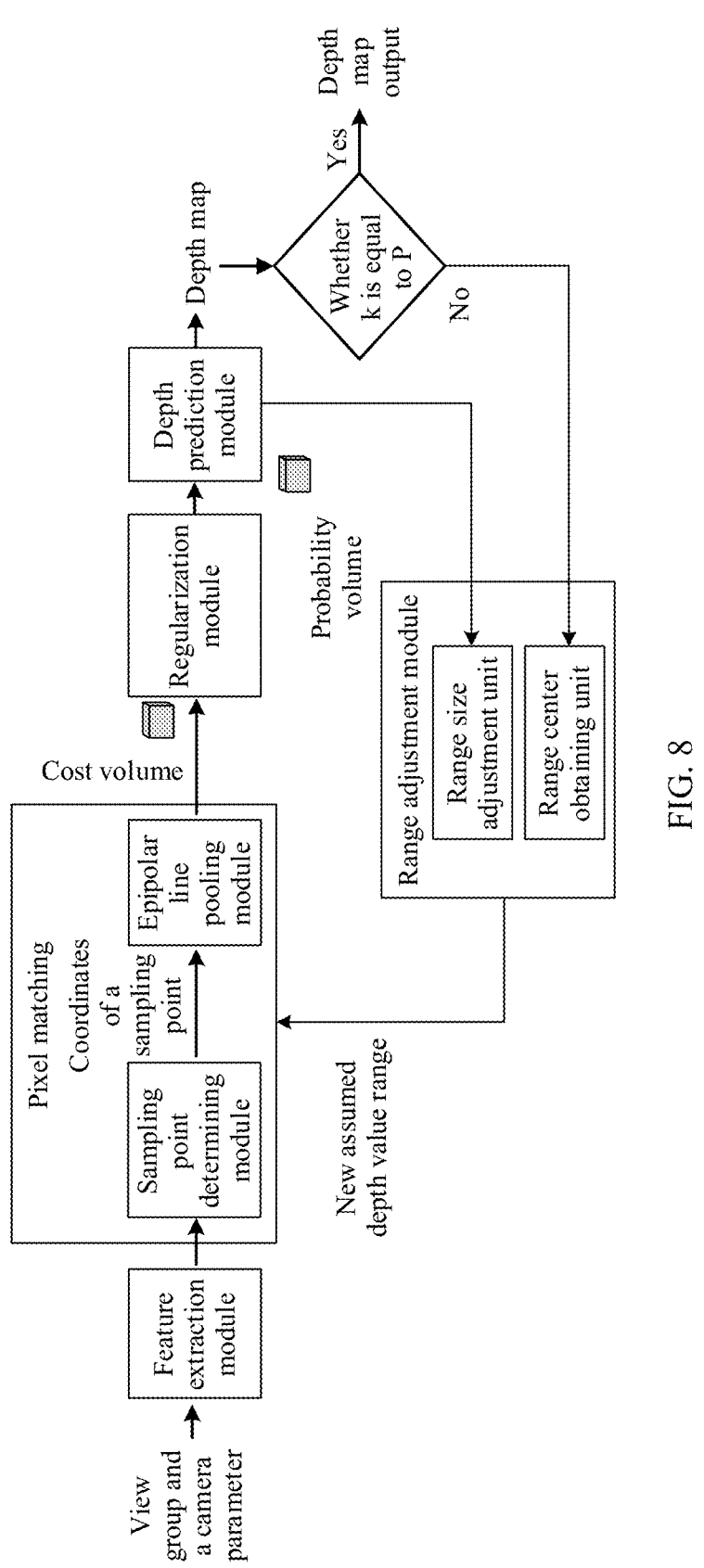
FIG. 8 is a schematic diagram of a structure of a neural network according to an embodiment of this application.

FIG. 8 shows an architecture for performing image depth prediction by using a neural network. For functions of functional modules in the architecture, refer to the foregoing description of the embodiment shown in FIG. 6. Details are not described herein again. Different from training of the neural network, when image depth prediction is performed by using the neural network, a trained parameter (for example, parameters of a feature extraction module and a regularization module) may be directly used to perform image depth prediction. In addition, input data does not include a true-value depth map, and the input data may include a view group and a corresponding addition parameter group. When k=P, that is, a predicted depth map determined in a last phase of the multi-phase depth prediction, may be output as a final prediction result.

In conclusion, according to the image depth prediction method provided in this embodiment of this application, a spacing between sampling points on the epipolar line in the secondary view may be determined, and the feature information around the sampling points may be aggregated by using appropriate dynamic pooling. On the premise that a shape of a subsequent cost volume is not changed, the pixel features on the epipolar line of the secondary view are fully utilized, and high precision is provided while high performance is ensured. In this way, a problem that the feature of each pixel on the epipolar line of the secondary view cannot be obtained through sampling when matching between pixels of the primary view and the secondary view is calculated is resolved. As a result, an area with a sharp texture change in the secondary view is not fully sampled, and a true value may be missed, thereby causing a depth prediction error. In addition, the following problems are resolved: When a sampling interval is small, a cost volume is large (a small interval is used, indicating that a quantity of assumed depths is large, resulting in a large cost volume), precision is high, but calculation time increases significantly; and when the sampling interval is large, the cost volume is small, required time is short, but the precision is severely affected.

In addition, according to the image depth prediction method provided in this embodiment of this application, a reliability degree of the depth prediction result may be quantized by calculating the entropy of the depth prediction probability in the current phase, so that the size of an assumed depth area of a next phase can be adaptively adjusted, and a value range of an assumed depth can be greatly scaled down without affecting a probability that a real depth falls within the adjusted assumed depth value range. This improves depth prediction efficiency. In addition, a problem that when the scale-down amplitude is manually set, if a prediction result of a previous phase is inaccurate, the real depth may be excluded from a value range of a scaled-down assumed depth is resolved.

In conclusion, an embodiment of this application provides an image depth prediction method. The method may be performed by an electronic device. As shown in FIG. 9, the method includes the following operations:

Operation 901: Obtain a primary view and a first secondary view, where the primary view and the first secondary view are images photographed by a camera facing a first object at different angles, the primary view includes a first pixel, the first pixel corresponds to a second pixel at a first assumed depth, and the second pixel is located on the first secondary view.

Operation 902: Update feature information of the second pixel based on the feature information of the second pixel and feature information of at least one third pixel, where the at least one third pixel is located on a connection line between the second pixel and a fourth pixel, the fourth pixel is a pixel that corresponds to the first pixel at a second assumed depth and that is on the first secondary view, the second assumed depth and the first assumed depth are adjacent in preset D assumed depths, and D is a positive integer greater than 1.

Operation 903: Obtain a probability of the first assumed depth based on feature information of the first pixel and the updated feature information of the second pixel, where the probability of the first assumed depth indicates a possibility that the first assumed depth is a real depth of the first pixel.

In some embodiments, the method further includes: updating feature information of the fourth pixel based on the feature information of the fourth pixel and feature information of at least one fifth pixel, where the at least one fifth pixel is located on a connection line between the second pixel and the fourth pixel; and obtaining a probability of the second assumed depth based on the feature information of the first pixel and the updated feature information of the fourth pixel, where the probability of the second assumed depth indicates a possibility that the second assumed depth is the real depth of the first pixel.

In an example of these embodiments, the at least one fifth pixel and the at least one third pixel are different from each other, and the at least one fifth pixel is closer to the fourth pixel than the at least one third pixel; or a pixel included in the at least one fifth pixel but not included in the at least one third pixel is closer to the fourth pixel than a pixel included in the at least one third pixel but not included in the at least one fifth pixel.

In one example of these embodiments, a union of the at least one fifth pixel and the at least one third pixel includes all pixels on the connection line between the second pixel and the fourth pixel.

In some embodiments, the method further includes: scaling down a size of a value range corresponding to the D assumed depths to obtain a size of a first range, where the first range is used as a value range of an assumed depth during depth re-prediction of the first pixel.

In an example of these embodiments, a scale-down amplitude of the value range corresponding to the D assumed depths is negatively correlated to an entropy value of the first pixel at the D assumed depths.

In some embodiments, the method further includes: scaling down a size of a value range corresponding to D' assumed depths to obtain a size of a second range, where the second range is used as a value range of an assumed depth during depth re-prediction of a sixth pixel, a scale-down amplitude of the value range corresponding to the D' assumed depths is equal to a scale-down amplitude of a value range corresponding to the D assumed depths, the sixth pixel is a pixel in the primary view and is different from the first pixel, and D' is a positive integer greater than 1.

In an example of these embodiments, the scale-down amplitude of the value range corresponding to the D assumed depths is negatively correlated to an entropy value of the first pixel at the D assumed depths and is negatively correlated to an entropy value of the sixth pixel at the D' assumed depths.

According to the image depth prediction method provided in embodiments of this application, features of pixels of non-sampling points on an epipolar line may be aggregated to features of nearby sampling points, so that depth prediction can be performed by using features of more pixels on the epipolar line without setting a larger quantity of assumed depths, thereby improving accuracy of depth prediction.

Refer to FIG. 10, an embodiment of this application provides an image depth prediction apparatus 1000. The apparatus 1000 includes the following.

An obtaining unit 1010 is configured to obtain a primary view and a first secondary view, where the primary view and the first secondary view are images photographed by a camera facing a first object at different angles, the primary view includes a first pixel, the first pixel corresponds to a second pixel at a first assumed depth, and the second pixel is located on the first secondary view.

An updating unit 1020 is configured to update feature information of the second pixel based on the feature information of the second pixel and feature information of at least one third pixel, where the at least one third pixel is located on a connection line between the second pixel and a fourth pixel, the fourth pixel is a pixel that corresponds to the first pixel at a second assumed depth and that is on the first secondary view, the second assumed depth and the first assumed depth are adjacent in preset D assumed depths, and D is a positive integer greater than 1.

An acquiring unit 1030 is configured to obtain a probability of the first assumed depth based on feature information of the first pixel and the updated feature information of the second pixel, where the probability of the first assumed depth indicates a possibility that the first assumed depth is a real depth of the first pixel.

Functional units of the apparatus 1000 may be implemented with reference to the method embodiments shown in FIG. 2 to FIG. 9, for example, the method embodiment shown in FIG. 9. Details are not described herein again.

The apparatus provided in embodiments of this application is mainly described above from a perspective of a method process. It may be understood that, to implement the foregoing functions, the terminal includes corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 11:
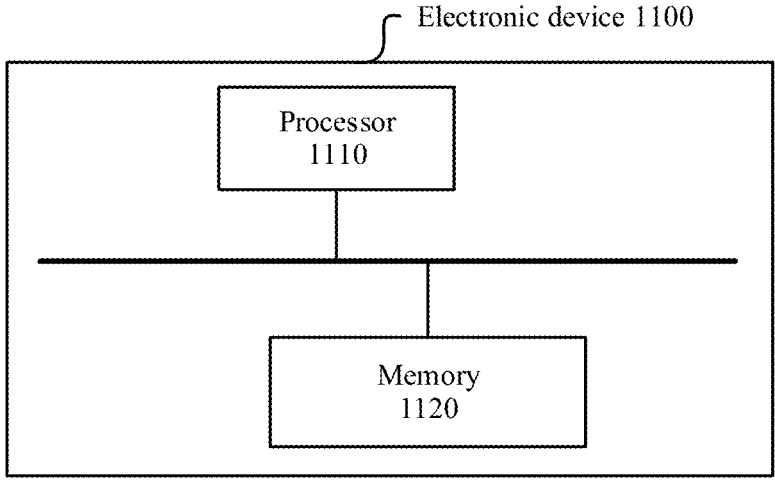
FIG. 11 is a schematic block diagram of an electronic device according to an embodiment of this application.

Refer to FIG. 11. An embodiment of this application provides an electronic device 1100. The electronic device 1100 may perform operations performed by the electronic device in the embodiments shown in FIG. 2 to FIG. 9, for example, as shown in FIG. 9. The electronic device 1100 may include a processor 1110 and a memory 1120. The memory 1120 stores instruction, and the instructions may be executed by the processor 1110. When the instructions are executed by the processor 1110, the electronic device 1000 may perform operations performed by the electronic device in the foregoing method embodiments, for example, operations performed by the electronic device in the embodiment shown in FIG. 9.

It may be understood that, the processor in embodiments of this application may be a central processing unit (CPU), and alternatively, the processor may be another general-purpose processor, a digital signal processor (DSP), an application-specific integrated circuit (ASIC), a field programmable gate array (FPGA) or another programmable logic device, a transistor logic device, a hardware component, or any combination thereof. The general purpose processor may be a microprocessor or any regular processor or the like.

The method operations in embodiments of this application may be implemented in a hardware manner, or may be implemented in a manner of executing software instructions by the processor. The software instructions may include corresponding software modules. The software modules may be stored in a random access memory (RAM), a flash memory, a read-only memory (ROM), a programmable read-only memory (programmable ROM, PROM), an erasable programmable read-only memory (erasable PROM, EPROM), an electrically erasable programmable read-only memory (electrically EPROM, EEPROM), a register, a hard disk drive, a removable hard disk drive, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (solid state disk, SSD)), or the like.

It may be understood that various numbers in embodiments of this application are merely used for differentiation for ease of description, and are not used to limit the scope of embodiments of this application.

What is claimed is:

1. An image depth prediction method, comprising:
obtaining a primary view and a first secondary view, wherein the primary view and the first secondary view are images photographed by a camera facing a first object at different angles, the primary view comprises a first pixel corresponding to a second pixel at a first assumed depth, and the second pixel is located on the first secondary view;
updating feature information of the second pixel based on the feature information of the second pixel and feature information of at least one third pixel, wherein the at least one third pixel is located on a connection line between the second pixel and a fourth pixel, the fourth pixel is a pixel that corresponds to the first pixel at a second assumed depth and that is on the first secondary view, the second assumed depth and the first assumed depth are adjacent in preset D assumed depths, and D is a positive integer greater than 1; and
obtaining a probability of the first assumed depth based on feature information of the first pixel and the updated feature information of the second pixel, wherein the probability of the first assumed depth indicates a possibility that the first assumed depth is a real depth of the first pixel.

2. The method according to claim 1, wherein the method further comprises:
updating feature information of the fourth pixel based on the feature information of the fourth pixel and feature information of at least one fifth pixel located on a connection line between the second pixel and the fourth pixel; and
obtaining a probability of the second assumed depth based on the feature information of the first pixel and the updated feature information of the fourth pixel, wherein the probability of the second assumed depth indicates a possibility that the second assumed depth is the real depth of the first pixel.

3. The method according to claim 2, wherein
the at least one fifth pixel and the at least one third pixel are different from each other, and the at least one fifth pixel is closer to the fourth pixel than the at least one third pixel; or
a pixel included in the at least one fifth pixel but not included in the at least one third pixel is closer to the fourth pixel than a pixel included in the at least one third pixel but not included in the at least one fifth pixel.

4. The method according to claim 2, wherein a union of the at least one fifth pixel and the at least one third pixel comprises all pixels on the connection line between the second pixel and the fourth pixel.

5. The method according to claim 1, wherein the method further comprises:

scaling down a size of a value range corresponding to the D assumed depths to obtain a size of a first range, wherein the first range is used as a value range of an assumed depth during depth re-prediction of the first pixel.

6. The method according to claim 5, wherein a scale-down amplitude of the value range corresponding to the D assumed depths is negatively correlated to an entropy value of the first pixel at the D assumed depths.

7. The method according to claim 4, wherein the method further comprises:

scaling down a size of a value range corresponding to D' assumed depths to obtain a size of a second range representing a value range of an assumed depth during depth re-prediction of a sixth pixel, a scale-down amplitude of the value range corresponding to the D' assumed depths is equal to a scale-down amplitude of a value range corresponding to the D assumed depths, the sixth pixel is a pixel in the primary view and is different from the first pixel, and D' is a positive integer greater than 1.

8. The method according to claim 7, wherein the scale-down amplitude of the value range corresponding to the D assumed depths is negatively correlated to an entropy value of the first pixel at the D assumed depths and is negatively correlated to an entropy value of the sixth pixel at the D' assumed depths.

9. An electronic device, wherein the electronic device comprises:

at least one processor; and at least one processor memory coupled to the at least one processor to store program instructions, which when executed by the at least one processor, cause the at least one processor to:

obtain a primary view and a first secondary view, wherein the primary view and the first secondary view are images photographed by a camera facing a first object at different angles, the primary view comprises a first pixel corresponding to a second pixel at a first assumed depth, and the second pixel is located on the first secondary view;

update feature information of the second pixel based on the feature information of the second pixel and feature information of at least one third pixel, wherein the at least one third pixel is located on a connection line between the second pixel and a fourth pixel, the fourth pixel is a pixel that corresponds to the first pixel at a second assumed depth and that is on the first secondary view, the second assumed depth and the first assumed depth are adjacent in preset D assumed depths, and D is a positive integer greater than 1; and obtain a probability of the first assumed depth based on feature information of the first pixel and the updated feature information of the second pixel, wherein the probability of the first assumed depth indicates a possibility that the first assumed depth is a real depth of the first pixel.

10. The electronic device according to claim 9, wherein the program instructions when executed further cause the at least one processor to:

update feature information of the fourth pixel based on the feature information of the fourth pixel and feature information of at least one fifth pixel located on a connection line between the second pixel and the fourth pixel; and obtain a probability of the second assumed depth based on the feature information of the first pixel and the updated feature information of the fourth pixel, wherein the probability of the second assumed depth indicates a possibility that the second assumed depth is the real depth of the first pixel.

11. The electronic device according to claim 10, wherein the at least one fifth pixel and the at least one third pixel are different from each other, and the at least one fifth pixel is closer to the fourth pixel than the at least one third pixel; or a pixel included in the at least one fifth pixel but not included in the at least one third pixel is closer to the fourth pixel than a pixel included in the at least one third pixel but not included in the at least one fifth pixel.

12. The electronic device according to claim 10, wherein a union of the at least one fifth pixel and the at least one third pixel comprises all pixels on the connection line between the second pixel and the fourth pixel.

13. The electronic device according to claim 9, wherein the program instructions when executed further cause the at least one processor to:

scale down a size of a value range corresponding to the D assumed depths to obtain a size of a first range, wherein the first range is used as a value range of an assumed depth during depth re-prediction of the first pixel.

14. The electronic device according to claim 12, wherein a scale-down amplitude of the value range corresponding to the D assumed depths is negatively correlated to an entropy value of the first pixel at the D assumed depths.

15. The electronic device according to claim 12, wherein the program instructions when executed further cause the at least one processor to:

scaling down a size of a value range corresponding to D' assumed depths to obtain a size of a second range, wherein the second range is used as a value range of an assumed depth during depth re-prediction of a sixth pixel, a scale-down amplitude of the value range corresponding to the D' assumed depths is equal to a scale-down amplitude of a value range corresponding to the D assumed depths, the sixth pixel is a pixel in the primary view and is different from the first pixel, and D' is a positive integer greater than 1.

16. The electronic device according to claim 15, wherein the scale-down amplitude of the value range corresponding to the D assumed depths is negatively correlated to an entropy value of the first pixel at the D assumed depths and is negatively correlated to an entropy value of the sixth pixel at the D' assumed depths.

17. A non-transitory computer-readable storage medium, storing one or more instructions that, when executed by at least one processor, cause the at least one processor to:

obtain a primary view and a first secondary view, wherein the primary view and the first secondary view are images photographed by a camera facing a first object at different angles, the primary view comprises a first pixel corresponding to a second pixel at a first assumed depth, and the second pixel is located on the first secondary view;

update feature information of the second pixel based on the feature information of the second pixel and feature information of at least one third pixel, wherein the at least one third pixel is located on a connection line between the second pixel and a fourth pixel, the fourth pixel is a pixel that corresponds to the first pixel at a second assumed depth and that is on the first secondary view, the second assumed depth and the first assumed depth are adjacent in preset D assumed depths, and D is a positive integer greater than 1; and obtain a probability of the first assumed depth based on feature information of the first pixel and the updated feature information of the second pixel, wherein the probability of the first assumed depth indicates a possibility that the first assumed depth is a real depth of the first pixel.

18. The non-transitory computer-readable storage medium according to claim 17, wherein the instructions when executed further cause the at least one processor to:

update feature information of the fourth pixel based on the feature information of the fourth pixel and feature information of at least one fifth pixel located on a connection line between the second pixel and the fourth pixel; and obtain a probability of the second assumed depth based on the feature information of the first pixel and the updated feature information of the fourth pixel, wherein the probability of the second assumed depth indicates a possibility that the second assumed depth is the real depth of the first pixel.

19. The non-transitory computer-readable storage medium according to claim 18, wherein the at least one fifth pixel and the at least one third pixel are different from each other, and the at least one fifth pixel is closer to the fourth pixel than the at least one third pixel; or a pixel included in the at least one fifth pixel but not included in the at least one third pixel is closer to the fourth pixel than a pixel included in the at least one third pixel but not included in the at least one fifth pixel.

20. The non-transitory computer-readable storage medium according to claim 18, wherein a union of the at least one fifth pixel and the at least one third pixel comprises all pixels on the connection line between the second pixel and the fourth pixel.

* * * * *